US012634263B2

(12) United States Patent
Kim

(10) Patent No.: US 12,634,263 B2
(45) Date of Patent: May 19, 2026

(54) TUNNELING AND GATEWAY ACCESS SYSTEM OPTIMIZED FOR DISTRIBUTED GATEWAY ENVIRONMENT, AND METHOD RELATED THERETO

(71) Applicant: PRIBIT Technology, Inc., Seoul (KR)

(72) Inventor: Young Rang Kim, Seoul (KR)

(73) Assignee: PRIBIT TECHNOLOGY, INC. (KR)

( * ) Notice: Subject to any disclaimer, the term of this patent is extended or adjusted under 35 U.S.C. 154(b) by 153 days.

(21) Appl. No.: 18/592,995

(22) Filed: Mar. 1, 2024

(65) Prior Publication Data

US 2024/0259349 A1     Aug. 1, 2024

Related U.S. Application Data

(63) Continuation     of     application     No. PCT/KR2022/013190, filed on Sep. 2, 2022.

(30) Foreign Application Priority Data

Sep. 2, 2021     (KR) ......................... 10-2021-0116648

(51) Int. Cl.
*H04L 9/40* (2022.01)
*H04L 12/46* (2006.01)

(52) U.S. Cl.
CPC ........ *H04L 63/029* (2013.01); *H04L 12/4633* (2013.01)

(58) Field of Classification Search
CPC ........................... H04L 63/029; H04L 12/4633
See application file for complete search history.

(56) References Cited

U.S. PATENT DOCUMENTS

2004/0001497 A1*   1/2004   Sharma ................. H04L 45/033
                                                         709/238
2015/0103989 A1*   4/2015   Nowack ............ H04M 15/8044
                                                         379/121.01
(Continued)

FOREIGN PATENT DOCUMENTS

KR     10-2016-0056118 A     5/2016
KR     10-2016-0123069 A     10/2016
(Continued)

*Primary Examiner* — Mohamed A. Wasel
(74) *Attorney, Agent, or Firm* — SEED INTELLECTUAL PROPERTY LAW GROUP LLP

(57) ABSTRACT

A node includes a communication circuit, a processor, and a memory storing an access control application. The memory stores instructions, when executed by the processor, causing the node to detect a network access event for a destination network, via the access control application, identify whether there are data flow and a tunnel corresponding to the destination network and authorized from an external server, via the access control application, and transmit a data packet through the tunnel, when there are the authorized data flow and the authorized tunnel. The tunnel is generated between the node and a gateway based on tunneling information received from the external server. The tunneling information includes information about tunnels and gateways in which the node is able to perform tunneling among the tunnels and gateways listed by the external server based on a node environment of the node and a network environment.

9 Claims, 16 Drawing Sheets

(56) References Cited

U.S. PATENT DOCUMENTS

| | | | |
|---|---|---|---|
| 2017/0078184 A1 | 3/2017 | Tang et al. | |
| 2017/0257228 A1* | 9/2017 | Chen | H04L 45/38 |
| 2017/0332312 A1 | 11/2017 | Jung et al. | |
| 2020/0351254 A1* | 11/2020 | Xiong | H04L 12/4633 |
| 2021/0091976 A1 | 3/2021 | Kim et al. | |
| 2021/0092094 A1 | 3/2021 | Kim et al. | |
| 2021/0092095 A1 | 3/2021 | Kim et al. | |
| 2021/0328830 A1 | 10/2021 | Kim et al. | |
| 2022/0247718 A1 | 8/2022 | Kim et al. | |
| 2022/0247719 A1 | 8/2022 | Kim et al. | |
| 2022/0247720 A1 | 8/2022 | Kim | |
| 2022/0247721 A1 | 8/2022 | Kim | |
| 2022/0247748 A1 | 8/2022 | Kim | |
| 2022/0255906 A1 | 8/2022 | Kim et al. | |
| 2022/0337604 A1 | 10/2022 | Kim et al. | |

FOREIGN PATENT DOCUMENTS

| | | |
|---|---|---|
| KR | 10-2017-0010835 A | 2/2017 |
| KR | 10-2019-0073114 A | 6/2019 |
| KR | 10-2119257 B1 | 6/2020 |
| KR | 10-2250505 B1 | 5/2021 |
| KR | 10-2349038 B1 | 1/2022 |

* cited by examiner

TUNNELING AND GATEWAY ACCESS SYSTEM OPTIMIZED FOR DISTRIBUTED GATEWAY ENVIRONMENT, AND METHOD RELATED THERETO

CROSS-REFERENCE WITH RELATED APPLICATIONS

The present disclosure claims the benefit of Korean Patent Application No. 10-2021-0116648 filed on Sep. 2, 2021 with the Korean Intellectual Property Office, the disclosure of which is incorporated herein by reference in its entirety.

BACKGROUND

Technical Field

Embodiments disclosed in the present disclosure relate to a tunneling and gateway access system optimized for a distributed gateway environment and a method thereof.

Description of the Related Art

An accessibility control technology or the like based on tunneling has a structure which should be connected with at one or more gateways to configure dedicated data packet flow for the terminal to access a destination node. Various technologies, such as IPSec, SSL/TLS-based OpenVPN, and Wireguard, are universally used for tunneling.

The tunneling technology is usually provided based on standardized specifications, but has a problem with compatibility depending on a type and a manufacturer. Particularly, because each available tunneling technology differs and an authentication scheme, a protocol version, or the like differs even in the same tunneling technology, due to the diversification (Microsoft Windows, Google Android, Apple iOS, and MacOS) of the terminal, there is a problem which is difficult to be applied to all terminals using one tunneling technology.

BRIEF SUMMARY

Technical Problem

IPSec tunneling provides a better element in terms of performance and stability than SSL/TLS-based tunneling for performing encryption and encapsulation in an application level because of performing encryption and encapsulation in an operating system (OS) level. However, when the terminal uses the IPSec tunneling, because double encapsulation is difficult due to the nature of the IPSec tunneling in the environment for establishing a site-to-site tunneling network based on the IPSec tunneling in the corresponding network, there occurs a problem in which the terminal is unable to use the IPSec tunneling.

In addition, as a UDP port (ports 500 and 4500) is commonly used to exchange an encryption key upon IPSec tunneling and there is a characteristic vulnerable to a DoS attack due to the nature of the protocol for the UDP, because an ISP or a firewall, a gateway, or the like present on the communication path blocks the corresponding protocol, a tunneling technology capable of being used according to the environment of the network as well as the environment of the terminal may be limited.

Furthermore, when a cloud or a network present in a remote place is accessed using the tunneling technology in network and task environments which are nationally, regionally and physically segmented, access to a gateway present at the boundary of the final destination node 204 should be maintained. For example, when a branch office in South Africa accesses a gateway present at the boundary of the cloud or network of the head office in Korea, because communication is performed through borders, routers, and the like between numerous countries present on the communication path and the encrypted data packets are simultaneously transmitted, there may occur a phenomenon in which communication performance is very degraded.

To address such a problem, an operator provides a dedicated line service between countries. However, there is a problem in which the utility value is lowered due to high introduction and maintenance costs.

Furthermore, a web acceleration technology for first providing some pieces of content or files received upon communication as cached information through a distributed cache server present on the communication path is also used. However, when transmitting and receiving real-time data incapable of being cached and when processing the encrypted data packet, because the cache server is unable to identify necessary information, there is a problem in which it is unable to use such a technology.

To address such a problem, there is a need for a technology capable of connecting gateways arranged on the distributed network which is closest to an area where the access terminal is located and the terminal, transmitting, by the corresponding gateway connected with the terminal, a data packet to gateways arranged on the cloud where a headquarters' service resource is present and the distributed network which is closest to the service resource using a dedicated network and a router or a dedicated line provided from the distributed network, and quickly accessing a destination node anywhere in the world using infrastructures provided by operators and cloud companies using a tunnel routing technology for a connection with a service resource at the corresponding gateway or a service resource connected with the gateway present at the headquarters' network boundary.

Particularly, because an accessibility control technology or the like based on tunneling has a structure in which tunneling should be connected between the terminal and the gateway for the terminal to perform communication with the destination node, there occurs a problem of having to perform the duplexing of the gateway.

To address all problems capable of being generated by using the tunneling technology, there is a need for various tunneling technologies depending on various terminals and network environments and edge gateways capable of ensuring performance should be arranged according to the access position of the terminal and two or more gateways should be arranged to prevent a network access fault.

As a result, because there is a need for at least four or more gateways whenever configuring one regional network to provide the optimized tunneling technology, there is a problem in which costs for introducing and maintaining a network infrastructure rapidly increases.

Various embodiments disclosed in the present disclosure may provide a terminal with an optimal tunneling access scheme with regard to the terminal and the network, geographical constraints, and a fault response.

Technical Solution

An aspect of the present disclosure provides a node may include a communication circuit, a processor operatively connected with the communication circuit, and a memory operatively connected with the processor and configured to store an access control application. The memory may store instructions, when executed by the processor, causing the node to detect a network access event for a destination network, by means of the access control application, identify whether there are data flow and a tunnel corresponding to the destination network and authorized from an external server, by means of the access control application, and transmit a data packet through the tunnel, when there are the authorized data flow and the authorized tunnel. The tunnel may be generated between the node and a gateway based on tunneling information received from the external server. The tunneling information may include information about one or more tunnels and gateways in which the node is able to perform tunneling among one or more tunnels and gateways listed by the external server based on a node environment of the node and a network environment.

In an embodiment, the node environment may include information about a distance between the node and the gateways. The listing of the gateways may be based on the information about the distance.

In an embodiment, the node environment may further include information about an operating system of the node. The listing of the gateways may be based on the operating system of the node.

In an embodiment, the node may first access a dedicated gateway, when there is the dedicated gateway for the node. That there is the dedicated gateway includes one of that there is a dedicated gateway for processing WIFI network traffic, that there is a dedicated gateway connected with an operator over a mobile network, or that the node is wired connected, the corresponding network is a dedicated network configured in the form of an intranet for the node, and there is a dedicated gateway for controlling a data packet at a boundary of the dedicated network.

In an embodiment, the node may request authentication information for requesting to access a gateway in a second rank to the external server, when the node fails in access to the identified gateway.

In an embodiment, the generating of the gateway and the tunnel based on the tunneling information may include requesting the gateway to generate a tunnel, by means of the access control application, receiving, by the node, a tunnel generation information request result from the external server, generating the tunnel, when access between the node and the gateway is possible as there is tunnel generation information received from the external server in the gateway, and performing tunnel generation failure processing, when it fails to generate the tunnel due to a change in situation of the network and the node.

In an embodiment, the performing of the tunnel generation failure processing may include retransmitting information about a changed node environment and a changed network environment to the external server, receiving gateway and tunneling information about one or more tunnels and gateways in which the node is able to perform tunneling among one or more tunnels and gateways listed based on the changed node environment and the changed network environment, from the external server, and requesting the gateway to generate the tunnel based on the tunneling information.

In an embodiment, the instructions may cause the node to request a change from the external server, such that data flow information dependent on an existing tunnel changes to an updated tunnel and the changed data flow information is transmitted to a new gateway, when the tunneling information replaces the tunnel previously requested to be generated, and request a gateway at which the existing tunnel is generated to delete previously generated tunnel information.

In an embodiment, the instructions may cause the node to detect a controller control event for the external server by means of the access control application, request controller access from the external server using the communication circuit, in response to the detected controller access event, and receive a first response to the controller access request from the external server, the first response including identification information of generated control flow and the tunneling information, update the authorized data flow based on the received tunneling information.

In an embodiment, the instructions may cause the node to receive a first user input for requesting user authentication, request user authentication for a user of the node from the external server, using the communication circuit, the user authentication request including information corresponding to the first user, receive a second response to the user authentication request from the external server, the second response including the tunneling information, and update the authorized data flow based on the tunneling information.

Advantageous Effects

According to embodiments disclosed in the present disclosure, a basic infrastructure capable of improving a network access speed (a bandwidth, latency, and the like) by setting an optimized routing path between an edge gateway and a core gateway locally divided on the network and configuring a dedicated network may be provided.

Furthermore, according to embodiments disclosed in the present disclosure, edge gateways may be arranged according to each area and coverage where there is a terminal to address a performance deterioration problem according to country and geographical restrictions which occur as the terminal directly accesses the destination node and each edge gateway may perform data flow-based connectivity control to more securely provide an environment in which it is able to access the destination anywhere in the world than using an existing simple technology such as IPSec VPN or SSL/TLS VPN.

Furthermore, according to embodiments disclosed in the present disclosure, a cost-effective network configuration is more possible when the above communication structure is provided using a cloud network and an infrastructure provided by a global cloud provider, than when a global MPLS or a dedicated line service is provided through a communication service provider and edge gateways may be arranged along the coverage of the cloud to provide an optimized virtual dedicated line depending on the position of the terminal.

Furthermore, according to embodiments disclosed in the present disclosure, when various terminals access the destination node on various network paths, because a tunneling scheme and detailed specifications capable of being applied according to the characteristic of the terminal are different, a connection may be relayed to a gateway for first providing IPSec tunneling optimized for performance and stability for a Windows terminal and a gateway connection for providing SSL/TLS tunneling optimized for compatibility may be relayed for an Android terminal.

Furthermore, according to embodiments disclosed in the present disclosure, because the function of an access control application capable of being applied according to the terminal's own security review is able to be limited, for an iOS terminal, a connection may be relayed with a gateway, the security of which is reinforced in a network level, to maintain security, when the access control function (e.g., a function such as deep packet inspection or the like) is limited.

Furthermore, according to embodiments disclosed in the present disclosure, when the IPSec tunneling function is impossible depending on the situation of the network even for a Windows terminal, for example, when an IPSec connection is impossible, such as when a UDP packet is blocked by a policy of a firewall or the like on the ISP and the network path, a connection may be relayed with a gateway capable of being connected using SSL/TLS tunneling in which there is no the problem to facilitate a network configuration capable of meeting both of performance and compatibility.

Furthermore, according to embodiments disclosed in the present disclosure, edge gateways optimized for each tunneling may be arranged according to a type of a terminal for each area, the number of the terminals, and a processing capacity of the terminals, because there is a limitation in loading several tunneling and a security function into one edge gateway and an access path may vary with priority to adjust gateways according to priorities, like a compatibility-first tunneling connection attempt, when tunnel is impossible after a performance-first tunneling connection attempt without the necessity of arranging a large amount of edge gateways to always maintain the same compatibility in all areas, such that all terminals present on the network are able to stably access the destination node depending on priorities.

Furthermore, according to embodiments disclosed in the present disclosure, for priority adjustment, the controller may adjust the gateway accessible to the terminal depending on information, such as the state of the gateway, for example, the number of tunnelings connected with the gateway, throughput, a processor occupancy rate, or whether there is a fault, thus providing a method capable of performing access through a bypass path when load distribution and a fault occur.

Furthermore, according to embodiments disclosed in the present disclosure, a method capable of decreasing an encryption level to improve performance upon access based on tunneling or accessing the edge gateway in the form of simple encapsulation may be provided, when the terminal connected with WIFI in the company accesses the destination node present in the company, depending on the type of the network with which the terminal is connected, or an optimized tunneling algorithm may be provided according to an access scheme of improving network performance through a dedicated line between the edge gateway and the destination node, when the terminal connected with the mobile network accesses the destination node through the edge gateway present in the operator.

Furthermore, according to embodiments disclosed in the present disclosure, it is possible to provide optimized tunneling and gateway depending on environments of all networks and terminals and access control in a data flow level may be performed, rather than providing simple tunneling such as an existing VPN, thus addressing all of performance, cost, and safety.

In addition, various effects ascertained directly or indirectly through the present disclosure may be provided.

DETAILED DESCRIPTION

Figure 1:
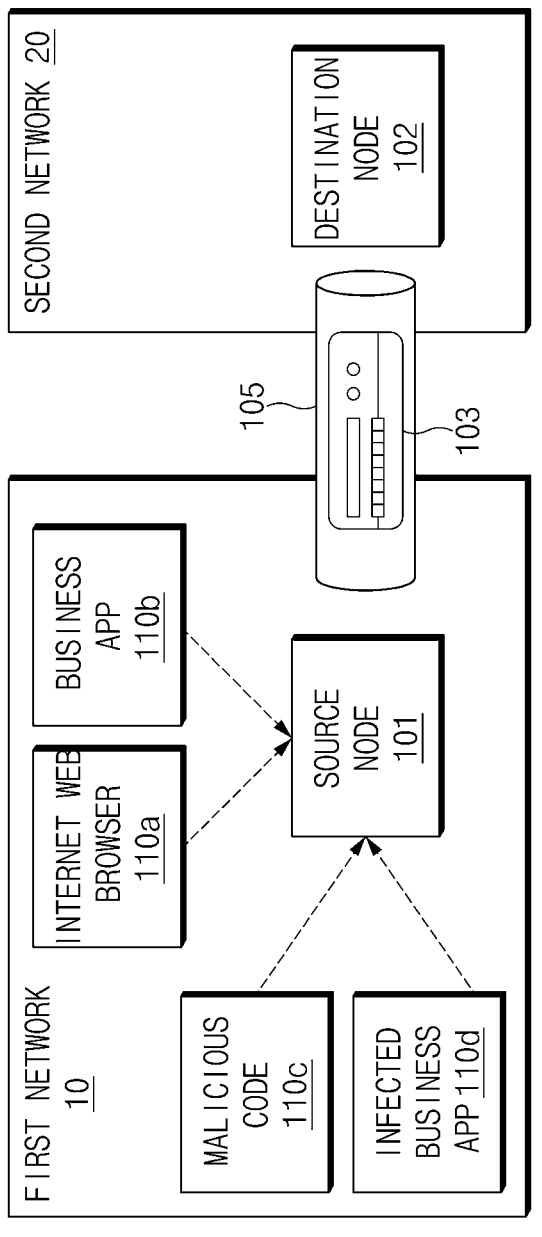
FIG. 1 illustrates an environment including a plurality of networks.

Hereinafter, various embodiments of the disclosure will be described with reference to the accompanying drawings. However, it should be understood that this is not intended to limit the disclosure to specific implementation forms and includes various modifications, equivalents, and/or alternatives of embodiments of the disclosure.

A singular form of a noun corresponding to an item in the present disclosure may include one or plural of the items, unless the relevant context clearly indicates otherwise. In the present disclosure, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). When it is mentioned a certain component (for example, first component) is coupled or connected to another component (for example, second component) with a term such as "operatively" or "communicatively" or without such a term, it indicates that the first component may be directly (for example, in a wired manner), wirelessly or through a third component.

Each (e.g., a module or a program) of the components described in the present disclosure may include a single entity or a plurality of entities. According to various embodiments, one or more of the above-described components or operations may be omitted, or one or more other components or operations may be added. Alternatively or additionally, a plurality of components (e.g., modules or programs) may be integrated into one component. In this case, the integrated component may perform one or more functions of each component of the plurality of components in the manner same as or similar to being performed by the corresponding component of the plurality of components prior to the integration. According to various embodiments, operations performed by the module, the program, or another component may be carried out sequentially, in parallel, repeatedly, or heuristically, or one or more of the operations may be executed in a different order or omitted, or one or more other operations may be added.

As used in the present disclosure, the term "module" may include a unit implemented in hardware, software, or firmware, and may interchangeably be used with other terms, for example, "logic," "logic block," "part," or "circuitry". A module may be an integral part, or a minimum unit or portion thereof, adapted to perform one or more functions. For example, according to an embodiment, the module may be implemented in the form of an application-specific integrated circuit (ASIC).

Various embodiments of the present disclosure may be implemented as software (e.g., a program or an application) including one or more instructions which are stored in a storage medium (e.g., a memory) readable by a machine. For example, a processor of the machine may invoke at least one of the stored one or more instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments disclosed in the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least a part of the computer program product may be temporarily generated or at least temporarily stored in the machine-readable storage medium, such as a memory of the manufacturer's server, a server of the application store, or a relay server.

FIG. 1 illustrates an environment including a plurality of networks.

Referring to FIG. 1, a first network 10 and a second network 20 may be different networks.

The first network 10 may include a source node 101. In FIG. 1 and embodiments described below, the 'source node' may be various types of devices capable of performing data communication. For example, the source node 101 may include a portable device, such as a smartphone and a tablet, a computer device, such as a desktop or a laptop, a multimedia device, a medical device, a camera, a wearable device, a virtual reality (VR) device, or a home appliance, but not limited to the above-mentioned devices. For example, the source node 101 may include a server or a gateway capable of transmitting a data packet through an application. The source node 101 may be referred to as an 'electronic device' or a 'terminal'. Meanwhile, a destination node 102 may include a device which is the same as or similar to the above-mentioned source node 101.

The source node 101 may attempt to access a second network 20 and may transmit data to the destination node 102 included in the second network 20. The source node 101 may transmit data to the destination node 102 through a gateway 103 and a tunnel 105.

When access of the source node 101 to the first network 10 is granted, because the source node 101 is able to communicate with all servers included in the first network 10, it may be exposed from an attack of a malicious program. For example, the source node 101 may receive a malicious code 110c or data of an untrusted or insecure application, such as an infected business application 110d, as well as an Internet web browser 110a or a trusted and/or secure application, such as a business application 110b.

The source node 101 infected from the malicious program may attempt to access the second network 20 and/or transmit data to the second network 20. When the second network 20 is established based on an IP like a VPN, it may be difficult for the second network 20 to separately monitor a plurality of devices included in the second network 20 and the second network 20 may be vulnerable to security for an application layer or a transport layer in an OSI layer. Furthermore, when the source node 101 includes a malicious application after the tunnel is already generated, data of the malicious application may be transmitted to another electronic device (e.g., the destination node 102) in the second network 20.

Figure 2:
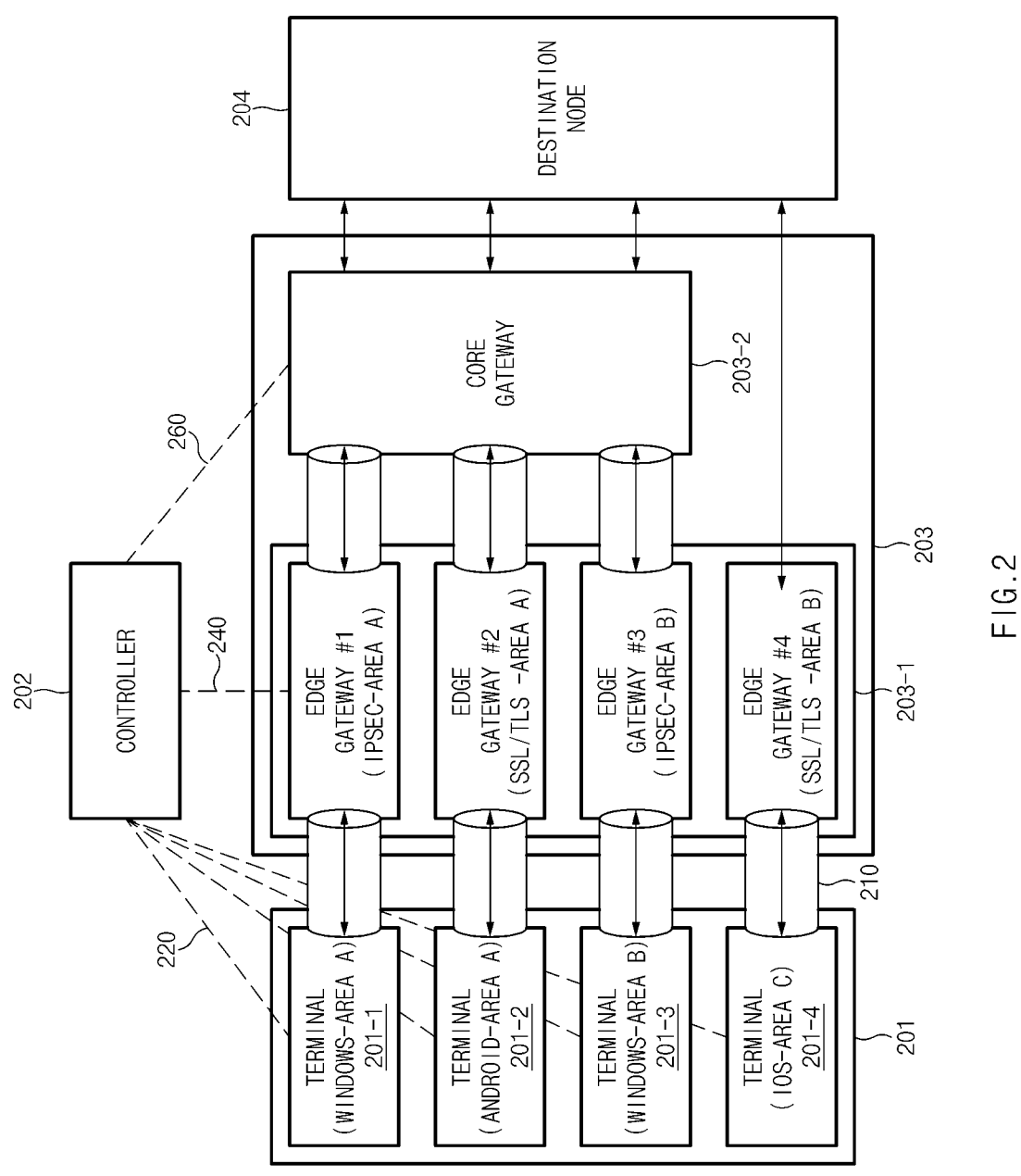
FIG. 2 illustrates an architecture in a network environment according to various embodiments.

FIG. 2 illustrates an architecture in a network environment according to various embodiments.

Referring to FIG. 2, the number of nodes 201, gateways 203, and destination nodes 204 is not limited to the number shown in FIG. 2. For example, the node 201 may transmit data to a plurality of destination nodes through a plurality of gateways, and a controller 202 (e.g., a server) may manage the plurality of nodes 201, the gateway 203, and the destination node 204. Meanwhile, some terminals 201-4 may transmit data to the destination node through an edge gateway 202-4 without passing without passing through a core gateway 203-2. The node 201 may perform the same or similar function to a source node 101 shown in FIG. 1. The edge gateway 203-1 and the core gateway 203-2 may be the same or similar function to a gateway 103 shown in FIG. 1. The destination node 204 may perform the same or similar function to a destination node 102 shown in FIG. 1.

According to an embodiment, the node 201 may include a Windows terminal 201-2 in area A, an Android terminal 201-2 in area A, a Windows terminal 201-3 in area B, and an iOS terminal 201-4 in area C. The node 201 may include an access control application for all network access control for an application in the node 201 and a network driver. The node 201 may identify whether it is accessible from the controller 202 when network access occurs and may transmit a data packet to the gateway 203 which is present at the boundary of an access target network through data flow information generated by the controller 202 only when it is accessible. A tunnel and data flow-based accessibility control technology provides a structure in which the node 201 is able to communicate only when there are a tunnel 210 and data flow authorized by the controller 202 to access a target network and provides a structure in which the node 201 is unable to communicate when there are no tunnel and data flow.

According to various embodiments, the node 201 may include an access control application (not shown) for managing network access of an application stored in the node 201 and a network driver (not shown). For example, the access control application may control transmission of a data packet by means of a kernel including an operating system in the node 201 and the network driver.

The controller 202 may be, for example, a server (or a cloud server). The controller 202 may manage data transmission between the node 201, the gateway 203, and the destination node 204 to ensure trusted data transmission in the network environment. The controller 202 may always maintain a secure network state, for example, control network access of the node 201, identify whether the tunnel 210 is generated between the gateway 203 and the gateway 203, remove the generated data flow depending on a security event received from each node 201 and the gateway 203, or isolate a terminal by means of a blacklist. For example, the controller 202 may manage access of the node 201 to the destination node 204 by means of policy information and blacklist information, may mediate generation of the authorized tunnel 210 between the node 201 and the gateway 203, or may remove the tunnel 210 depending on the security event collected from the node 201 or the gateway 203. The node 201 may communicate with the destination node 204 through only the tunnel 210 authorized by the controller 202. When there is no the authorized tunnel 210, access of the terminal 2014 to the destination network 204 may be blocked. According to an embodiment, the controller 202 may transmit and receive a control data packet with the node 201 to perform various operations (e.g., registration, approval, authentication, update, or end) associated with the network access of the node 201. Furthermore, the controller 202 may transmit and receive a control data packet with the destination node 204 to perform various operations (e.g., registration, approval, authentication, update, or end) associated with the network access and the network reception of the destination node 204. Flow 220, 240, or 260 in which the control data packet is transmitted may be referred to as control flow. Meanwhile, the controller 202 may include a server or an external server.

The gateway 203 may identify 5-tuples information among data packets received through the authorized tunnel 210 among the received packets. When there is data flow information corresponding to a source IP, a destination IP, and destination port information, the gateway 203 may forward the data flow information to the destination node 204. The gateway 203 may include an edge gateway 203-1 and a core gateway 203-2. The gateway 203 may include an edge gateway 203-1 and a core gateway 203-2. The number of the edge gateways 203-1 and the core gateways 203-2 is not limited to the number shown in FIG. 2. The edge gateways 203-1 may be arranged in a distributed network with regard to a type of a terminal to be supported for each area and coverage, an average distance, the number and processing capacity of terminals to be processed, a tunneling type and load distribution according to a network situation, a network access type (a wireless network, WIFI, a wired network, or the like), or an element for high availability.

By providing a scheme in which each edge gateway 203-1 is directly connected with the destination node 204 according to a distributed network environment or is connected with the terminal and the destination node 204 through the core gateway 203-2 which is present at the boundary of the destination node 204, the node 201 may address a network performance deterioration problem capable of being generated according to various situations, such as a network and a regional boundary, through an efficient routing path on a distributed network between the edge gateway 203-1 or the core gateway 203-2 or the destination node 204 and a dedicated network.

Figure 3:
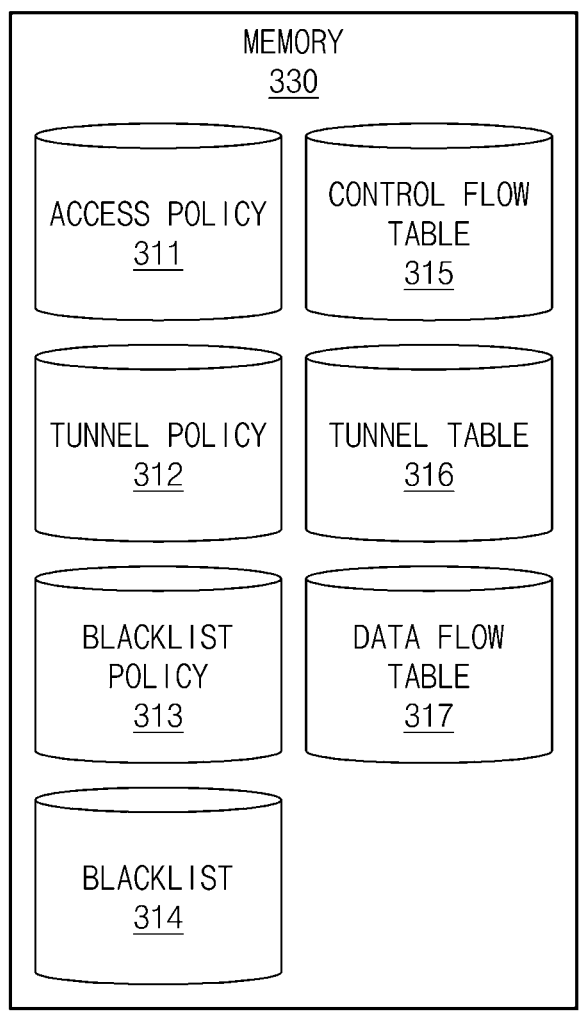
FIG. 3 is a functional block diagram illustrating a database stored in a controller according to various embodiments.

FIG. 3 is a functional block diagram illustrating a database stored in a controller (e.g., a controller 202 of FIG. 2) according to various embodiments. FIG. 3 illustrate only a memory 330. However, the controller may further include a communication circuit (e.g., a communication circuit 430 of FIG. 4) for performing communication with an external electronic device (e.g., a terminal (201-1, 201-2, 201-3, or 201-4, a gateway 203, or a destination node 204 of FIG. 2) and a processor (e.g., a processor 410 of FIG. 4) for controlling the overall operation of the controller.

Referring to FIG. 3, the controller may store databases 311 to 317 for controlling network access and data transmission in a memory 330.

The access policy database 311 may include information about an identified network, a network accessible by a terminal, a destination node, a user, or an application, and/or a service. For example, when access to the destination node 204 is requested from a node 201, the controller 202 may determine whether a network identified based on the access policy database 311 (e.g., a network to which a terminal belongs), the node 201, a user (e.g., a user of the node 201), and/or an application (or an application included in the node 201) are/is accessible to the destination node 204. In an embodiment, the access policy database 311 may include data packet inspection information. For example, the data packet inspection information may include a rule database indicating whether there is a need to inspect a data packet. Herein, the rule database may include at least one of a data packet inspection method (e.g., an inspection of a single data packet or an inspection of a plurality of data packets), a pattern to be applied when inspecting a data packet, a position to be applied upon inspecting the data packet, and a processing method after the inspection (e.g., data packet blocking, data packet replacement, and data packet copying).

The tunnel policy database 312 may include a type of a tunnel to be connected with a gateway which is present at a boundary between the terminal and the network on a connection path, an encryption method, and gateway information first accessible according to several environments factors including encryption level information, a position of the terminal, network type information, a state of the gateway, and the like. For example, when access to the destination node 204 is requested from the node 201, the controller 202 may provide the terminal with an optimal tunnel for accessing the destination node 204 and information about it based on the tunnel policy database 312.

The blacklist policy database 313 may include a policy for permanently or temporarily blocking access of a specific node (e.g., the node 201 or the destination node 204). The policy of the blacklist policy database 313 may be generated based on a risk of a security event among security events periodically collected by the node 201, the destination node 204, or the gateway 203, a cycle of occurrence of the security event, and/or information (e.g., at least one of a terminal identifier (ID), an IP address, a media access control (MAC) address, or a user ID) identified through a behavior analysis.

The blacklist database 314 may include a list of at least one of a terminal, a destination node, an IP address, a MAC address, or a user blocked by the blacklist policy database 313. For example, when identification information of the node 201 which requests access to the destination node 204 is included in the blacklist database 314, the controller 202 may deny the access request of the terminal to isolate the terminal from the destination node.

The control flow table 315 is an example of a session table for managing flow (e.g., control flow) of a control data packet generated between the node (e.g., the node 201 or the destination node 204) and the controller 202. When the node 201 successfully accesses the controller 202, control flow information and identification information for identifying the control flow may be generated by the controller 202. The control flow information may include at least one of identification information of the control flow, an IP address identified upon access and authentication for the controller, a node ID (a terminal ID), or a user ID. For example, when access to the destination node is request from the terminal, the controller 202 may search for control flow information by means of the control flow identification information received from the node 201 and may map at least one of the IP address, the terminal ID, or the user ID included in the found control flow information to the access policy database 311, thus determining whether the terminal is accessible and whether to generate data flow.

According to an embodiment, the control flow may have an expiration time. The node (e.g., the node 201 or the destination node 204) should update the expiration time of the control flow. When the expiration time is not updated during a certain time, the control flow (or the control flow information) may be removed. Furthermore, when it is determined that there is a need to immediately block access depending on the security event collected from the terminal or the gateway or depending on an access end request of the terminal, the controller 201 may remove the control flow. When the control flow is removed, because all data flow, which is previously generated, is collected, all access of the terminal may be blocked.

The tunnel table 316 is a table for managing a tunnel connected between the terminal and the gateway and between the gateway and the gateway (e.g., edge gateways 202-1, 202-2, 202-3, and 202-4 and core gateways 203). The tunnel may be generated for, for example, each device or IP. For example, the tunnel table 316 may be a table for managing a tunnel connected between the node 201 and the gateway 203 and between the edge gateway 203-1 and the core gateway 203-2. When there is a valid tunnel, the tunnel table 316 may include tunnel identification information (a tunnel ID) for managing and identifying the tunnel, control flow identification information (a control flow ID) for control between the gateway 203 and the controller 202, a tunnel end point (TEP), a tunnel start point (TSP), a tunnel algorithm, a tunnel type, and/or additional information for managing the tunnel.

The data flow table 317 may be a table for managing flow (e.g., data flow) in which a detailed data packet is transmitted between the node 201 and the gateway 203, which may manage data flow for each TCP session, for each application of a source terminal, or in more detailed units in a tunnel generated for each terminal or IP. The data flow table 317 may include data flow identification information, dependent control flow identification information when data flow is dependent on control flow, an application ID for identifying whether the data packet transmitted from the node 201 is an authorized data packet, a source IP address, a destination IP address, and/or a service port. Furthermore, the data flow table 317 may include identification information of a tunnel in which a data flow will be used. Furthermore, the data flow table 317 may include a header (or header information) for determining whether a data packet is valid. Furthermore, the data flow table may further include whether a data flow header which is authentication information is inserted into the data packet, a header insertion scheme, whether is a need to authenticate the data flow, an authentication state, and/or an authentication expiration date. Furthermore, the data flow table 317 may include terminal information (e.g., a source IP) of the destination node, service port information, and receivable application information. In an embodiment, the data flow table 317 may include data packet inspection information.

Furthermore, the structure of the data flow table included in the controller 202 may be applied to the node 201 and the gateway 203 in a same or similar manner.

Figure 4:
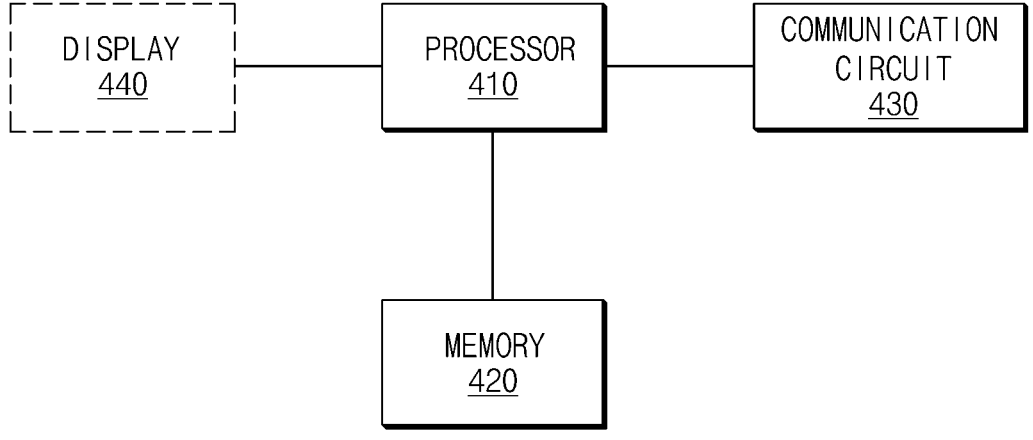
FIG. 4 illustrates a functional block diagram of a node according to various embodiments.

FIG. 4 illustrates a functional block diagram of a node (e.g., a node 201 and a destination node 204 of FIG. 2) according to various embodiments. Referring to FIG. 4, the node may be the node 201 and may include a processor 410, a memory 420, and a communication circuit 430. According to an embodiment, the node may further include a display 440 for performing an interface with a user.

The processor 410 may control the overall operation of the node 201. In various embodiments, the processor 410 may include one processor single core or may include a plurality of processor cores. For example, the processor 410 may include a multi-core such as a dual-core, a quad-core, or a hexa-core. According to embodiments, the processor 410 may further include a cache memory located internally or externally. According to various embodiments, the processor 410 may be configured with one or more processors. For example, the processor 410 may include at least one of an application processor, a communication processor, or a graphical processing unit (GPU).

All or a portion of the processor 410 may be electrically or operatively coupled with or connected to another component (e.g., the memory 420, the communication circuit 430, or the display 440) in the node. The processor 410 may receive commands of other components of the node, may interpret the received commands, and may perform calculation or may process data, depending on the interpreted commands. The processor 410 may interpret and process a message, data, an instruction, or a signal received from the memory 420, the communication circuit 430, or the display 440. The processor 410 may generate a new message, data, instruction, or signal based on the received message, data, instruction, or signal. The processor 410 may provide the memory 420, the communication circuit 430, or the display 400 with the processed or generated message, data, instruction, or signal.

The processor 410 may process data or a signal which is generated or occurs by a program. For example, the processor 410 may request an instruction, data, or a signal from the memory 420 to run or control the program. The processor 410 may record (or store) or update an instruction, data, or a signal in the memory 420 to run or control the program.

The memory 420 may store an instruction to control the node, a control instruction code, control data, or user data. For example, the memory 420 may include at least one of an application program, an operating system (OS) (e.g., Microsoft Windows, Google Android, Apple iOS, MacOS, or the like), middleware, or a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), or the like. The non-volatile memory may include a read only memory (ROM), a programmable ROM (PROM), an electrically programmable ROM (EPROM), an electrically erasable programmable ROM (EEPROM), a flash memory, or the like. The memory 420 may further include a non-volatile medium such as a hard disk drive (HDD), a solid state disk (SSD), an embedded multimedia card (eMMC), or universal flash storage (UFS).

According to an embodiment, the memory 420 may store a portion of information included in a memory (e.g., a memory 330 of FIG. 3) of the controller 202. For example, the memory 420 may store a tunnel table 316 and a data flow table 317 described in FIG. 3.

The communication circuit 430 may establish a wired or wireless communication connection between the node 201 and an external electronic device (e.g., a controller 202 or a gateway 203 of FIG. 2) and may support to perform communication through the established connection. According to an embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit or a power line communication circuit) and may communicate with the external electronic device using a corresponding communication module among them over the short-range communication network, such as a Bluetooth, WiFi direct, or infrared data association (IrDA), or the long-range wireless communication network, such as a cellular network, the Internet, or a computer network. The above-mentioned several types of communication circuits 430 may be implemented as one chip or may be respectively implemented as separate chips.

The display 440 may visually output content, data, or a signal. In various embodiments, the display 440 may display image data processed by the processor 410. According to embodiments, the display 440 may be coupled with a plurality of touch sensors (not shown) capable of receiving a touch input or the like to be configured with an integrated touch screen. When the display 440 is configured with the touch screen, the plurality of touch sensors may be arranged over the display 440 or under the display 440.

Meanwhile, a server (e.g., a controller 202) according to an embodiment may include the processor 410, the memory 420, and the communication circuit 430. The processor 410, the memory 420, and the communication circuit 430 included in the server may be substantially the same as the processor 410, the memory 420, and the communication circuit 430, which are described above.

Figure 5:
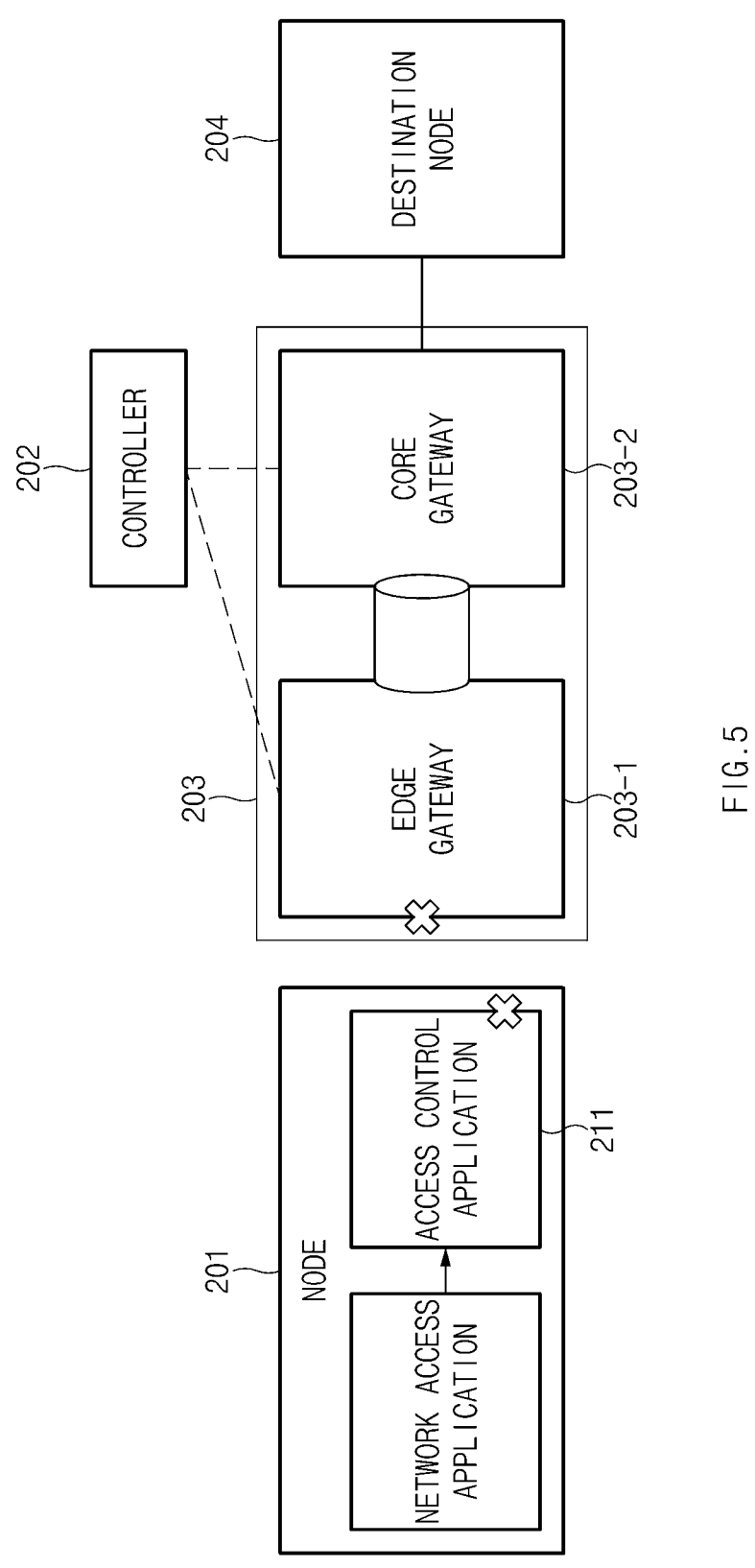
FIG. 5 describes an operation of blocking network access according to various embodiments.

FIG. 5 illustrates an operation of blocking network access according to various embodiments.

According to an embodiment, as blocked at a network driver and a kernel stage of an operating system, any data packet except for an access control application 211 may fail to be transmitted to a network (access blocking at the access control application).

According to an embodiment, for a non-management terminal in which the access control application 211 is not installed among terminals 201 which are present on the network, a network access application may transmit an unauthorized data packet to the network. However, because a gateway 203 (e.g., an edge gateway 203-1), which is present at the boundary of the network blocks all of data packets in which an authorized tunnel and data flow is not present, in effect, a data packet of the terminal, particularly, a data packet for generating a TCP session may be blocked (access blocking at the gateway as there is no tunnel).

As such, when access is blocked at the access control application or when access is blocked at the gateway as there is no tunnel, a node 201 may be in a state in which it is unable to reach a target network (e.g., a destination node 204), that is, a state in which it is isolated.

Figure 6:
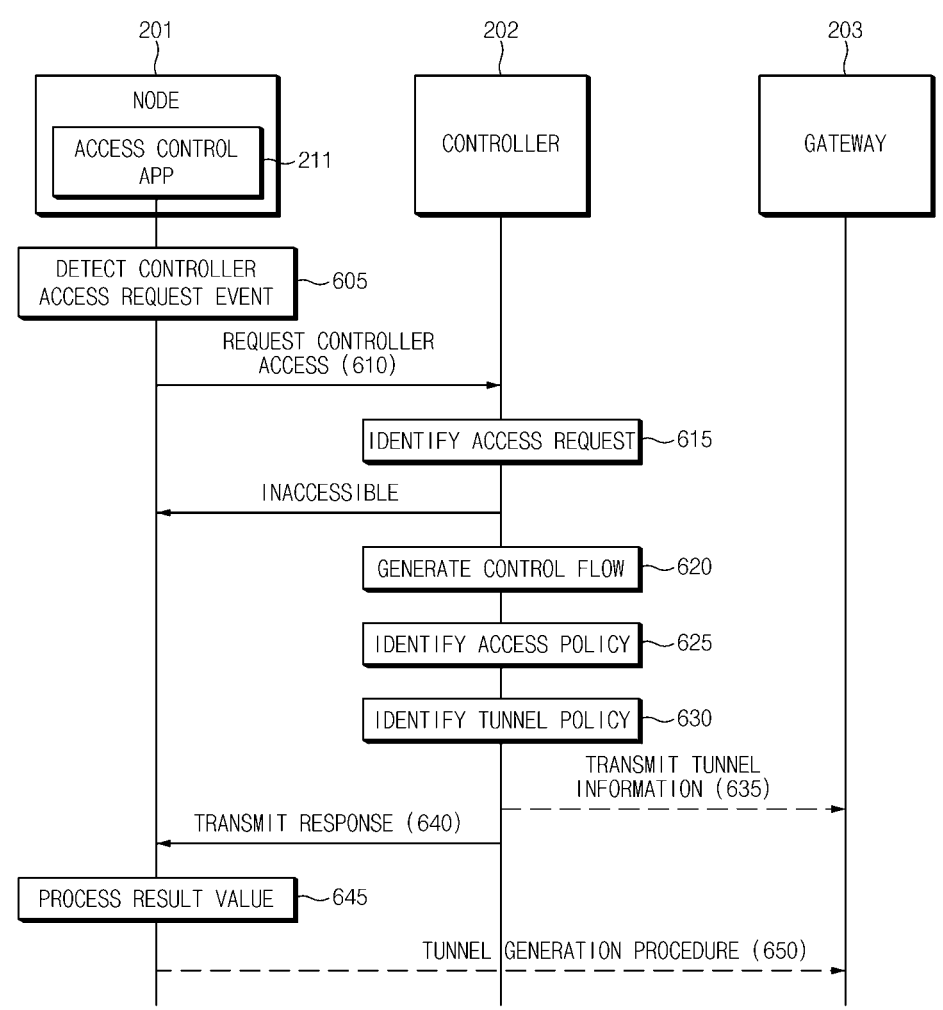
FIG. 6 illustrates a signal sequence diagram for controller access according to various embodiments.
Figure 7:
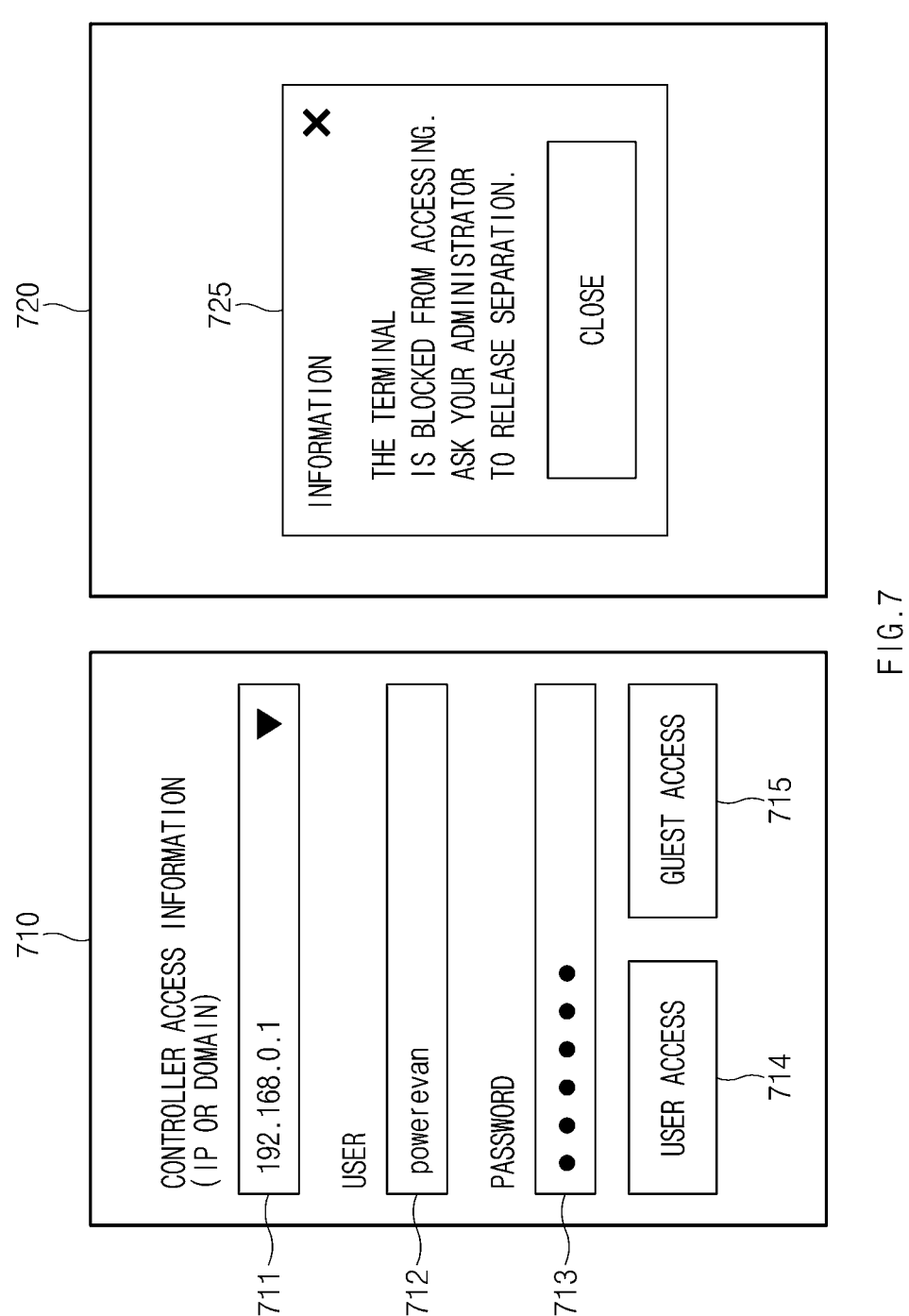
FIG. 7 illustrates a user interface screen for controller access according to various embodiments.

FIGS. 6 and 7 illustrates an operation for controller access according to various embodiments. FIG. 6 illustrates a signal sequence diagram for controller access. FIG. 7 illustrates a user interface screen for controller access.

Because a node 201 is required to be authorized by a controller 202 to access or receive a network, an access control application 211 of the node 201 may request the controller 202 to generate control flow (control data packet flow and a series of sessions), thus attempting controller access of the node 201. Furthermore, the access control application 211 may include an access control application 211 in FIG. 2.

Referring to FIG. 6, in operation 605, the node 201 may detect a controller access event. For example, the node 201 may detect that the access control application 211 is installed and run in the node 201, and that access to the controller 202 is requested by means of the access control application 211.

As an example, referring to FIG. 7, when the access control application 211 is run, the node 201 may display a user interface screen 710 for receiving necessary information for controller access. The user interface screen 710 may include an input window 711 for inputting an IP or a domain of the controller 202, an input window 712 for inputting a user ID, an input window 713 for inputting a password, and/or an input window 714 for inputting an access position. By receiving a button 715 for controller access of an authenticated user after pieces of information about the input windows 711 to 714 are input, the node 201 may detect the controller access event. As another example, when the user authentication of the node 201 is not completed yet, the node 201 may receive a button 716 for controller access of an unauthorized user (i.e., a guest) to detect the controller access event.

In operation 610, the node 201 may request controller access from the controller 202 in response to detecting the controller access event. The node 201 may request the controller access by means of the access control application 211. According to an embodiment, the access control application 211 may transmit identification information (e.g., a terminal ID, an IP address, or a MAC address) of the node 201, a type of the node 201, position information of the node 201, an environment of the node 201, identification information of a network including the node 201 and/or identification information of the access control application 211, basic local information selected by the user, or the like to the controller 202.

In operation 615, the controller 202 may identify whether the node 201 is accessible in response to the received request. According to an embodiment, the controller 202 may identify whether the node 201 is accessible based on a database included in a memory (e.g., a memory 330 of FIG. 3) of the controller 202. The controller 202 may identify whether the terminal 201 is accessible based on whether information received from the access control application 211 is included in an access policy database and whether identification information of the node 201 and/or the network to which the node 201 belongs is included in a blacklist database. For example, the controller 202 may identify whether the node 201 is accessible based on whether the information (e.g., the type of the corresponding terminal, the position information of the corresponding terminal, the environment of the corresponding terminal, and the network including the terminal, the access control application information, the basic local information selected by the user, or the like) requested for access by the access control application 211 is accessible by the policy and/or whether the terminal and network identification information (the terminal ID, the IP, the MAC address, or the like) is included in the blacklist database.

When the node 201 is accessible, in operation 620, the controller 202 may generate control flow between the node 201 and the controller 202. In this case, the controller 202 may generate control flow identification information in the form of a random number and may store the identification information of the node 201 and/or the network to the which the node 201 belongs in a control flow table. The information (e.g., the control flow identification information and/or the control flow information) stored in the control flow table may be used for policy identification and/or validation for user authentication of the node 201, an information update of the node 201, or network access of the node 201.

When the node 201 is inaccessible is included in a blacklist, in operation 615, the controller 202 may not generate control flow and may transmit a response indicating that the controller access of the node 201 is impossible to the node 201.

In operation 625, the controller 202 may identify whether there is information of a destination network (a destination node) with which the current accessed node 201 is basically connected, in an access policy and a tunnel policy matched with the identified information (the terminal or source network information or the like).

In operation 625, when it is accessible, for the corresponding node 201 to access the destination network, tunneling types and gateways with which the terminal is able to be connected may be listed by means of information, such as a type of a terminal included in control flow, position information of the terminal, an environment of the terminal, and a network including the terminal, an IP address of the terminal, which is identified by means of the controller 202, an IP address of the terminal, which is identified by the terminal, and the like and states of the listed gateways (throughput and whether there is a fault) may be identified to identify one tunnel and one gateway optimized for the corresponding terminal among the listed gateways. In an embodiment, the gateway 203 may be an edge gateway 203-1.

In operation 630, to provide and identify the optimized gateway, an order of gateways closest to an area where the node 201 is located may be sorted, an order for providing tunneling optimized for the terminal may be sorted in an order of the gateway 203 capable of generating an IPSec tunnel which is accessible most stably by the tunnel policy when the node 201 is Windows and the gateway 203 capable of generating an SSL/TLS tunnel optimized for Android when the node 201 is Android, the corresponding gateway 203 may be excluded from the list when it is during a fault, and an order may be sorted according the remaining amount of capacity (e.g., a tunnel access number or processor usage, a network bandwidth, or the like) capable of being processed by the corresponding gateway 203.

When the corresponding node 201 is connected with WIFI and there is the dedicated gateway 203 for processing WIFI network traffic, when there is the dedicated gateway 203 connected with an operator over a mobile network (3G, LTE, 5G, or the like), when the node 201 is wiredly connected, the corresponding network is a dedicated network configured in the form of an intranet for the corresponding terminal, and there is a dedicated gateway for controlling a data packet at the boundary of the dedicated network, or the like, an order may be sorted according to the gateway 203 to which the node 201 is first accessible. The other criteria of sorting may be added and changed with regard to cost for each interval or the like for processing data traffic on a distributed network, a billing system, a variable, or the like.

According to an embodiment, the controller 202 may calculate the corresponding sorting criterion in a complex manner and may sort gateways capable of being provided to the corresponding node 201 in order, thus processing the gateways to be selected for each rank.

In 635, when there are a tunnel and a gateway to which the node 201 is accessible, the controller 202 may transmit authentication and a series of pieces of information in which the corresponding terminal is able to generate the tunnel at the gateway 203 to the node 201, may register the corresponding tunnel generation information in a tunnel table 316, and may transmit the corresponding tunnel generation information to the gateway 203. In operation 640, the gateway 203 (the edge gateway 203-1) may receive the tunnel generation request from the controller 202.

When there is a gateway in a second rank among the listed gateways, information about whether it is accessible to the gateway in the second rank may be returned when access fails. When the terminal is inaccessible to the corresponding gateway, authentication information for requesting to access the gateway in the second rank may be requested from the controller.

When there are the tunnel and the gateway accessible to the node 201, but it is impossible to access the tunnel because there is a large amount of throughput or there is a fault, information for reattempt for tunnel access may be returned to the terminal.

In operation 645, the node 201 may process an access request result value received from the controller 202. When it is inaccessible, the execution of the access control application may be stopped and ended, or a related error message may be displayed. According to embodiment, when receiving the response indicating that the node 201 is inaccessible, the node 201 may output a user interface screen indicating that it is inaccessible to the gateway to the user. For example, referring to FIG. 7, the node 201 may display a user interface screen 720 by means of the access control application 211. The user interface screen 720 may include a user interface screen 725 indicating (717) that there is no gateway accessible at the corresponding position of the node 201 in FIG. 7B, indicating (718) that it reattempts access after 30 seconds in FIG. 7C, and indicating (719) that the access to the gateway is ended and access to another gateway is attempted.

In operation 650, when there is a need to generate a tunnel, the node 201 may request to generate the tunnel. When there are the tunnel 210 and the gateway 203 to which the node 201 is accessible in operation 635, it may be requested to generate the tunnel, using authentication and a series of pieces of information in which the corresponding node 201 is able to generate the tunnel 210 at the gateway 203, which are received from the controller 202. The gateway 203 (the edge gateway 203-1) may proceed with the generation of the tunnel requested from the node 201, using the corresponding tunnel generation received from the controller 202 in operation 640.

Figure 8:
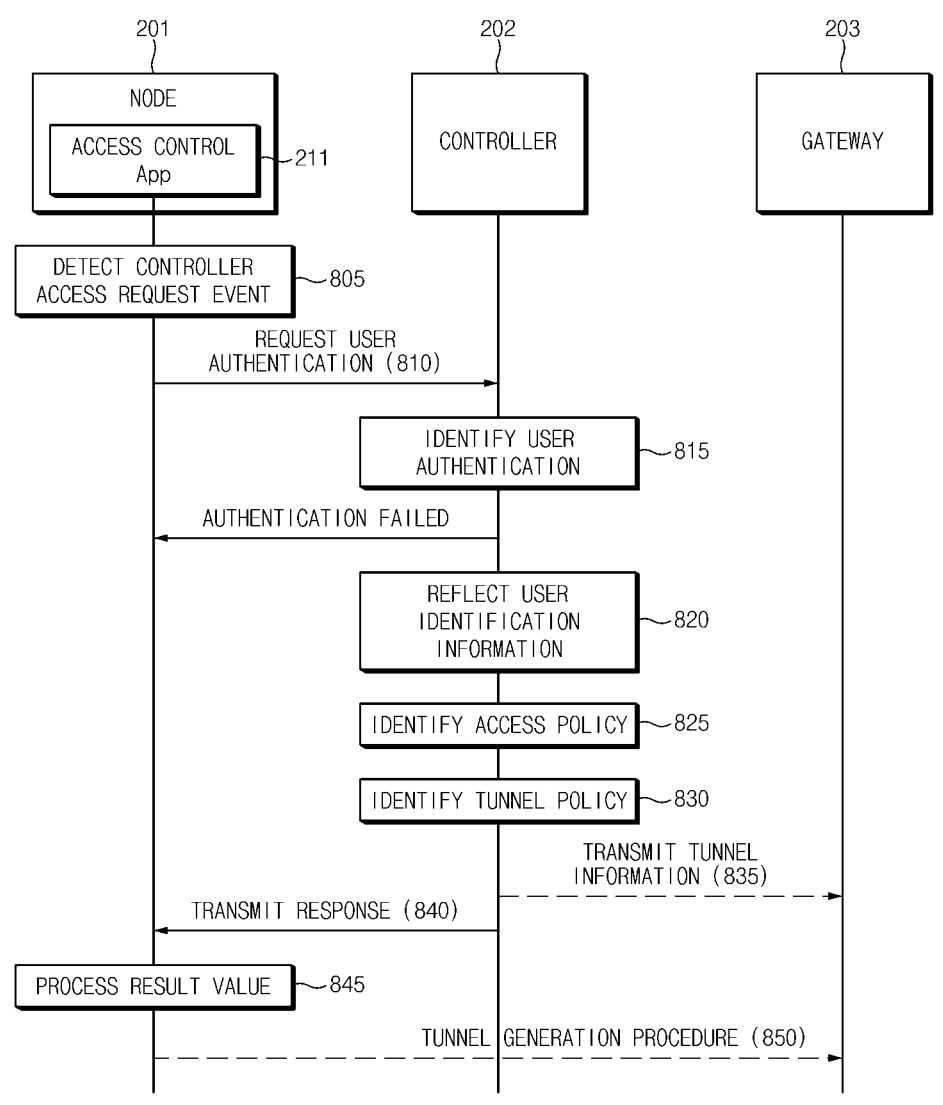
FIG. 8 illustrates a signal sequence diagram for user authentication according to various embodiments.

FIG. 8 illustrates a signal sequence diagram for user authentication according to various embodiments.

For a node 201 to receive detailed access right for a destination network, an access control application 211 (e.g., an access control application 211 of FIG. 2) of the node 201 may receive authentication for a user of the node 201 from a controller 202. The access control application 211 may perform user authentication to receive the detailed access right of the network and may transmit a user ID and a password or authentication information by a reinforced authentication method.

Referring to FIG. 8, in operation 805, the source node 201 may receive an input for user authentication. The input for user authentication may be, for example, a user input for inputting a user ID and a password. For another example, the input for user authentication may be a user input (e.g., biometric information, a fingerprint, an iris, or the like) for more reinforced authentication.

In operation 810, the source node 201 may request user authentication from the controller 202. For example, the access control application 211 may transmit input information for user authentication to the controller 202. When control flow between the source node 201 and the controller 202 is already generated, the access control application 211 may transmit the input information for user authentication together with control flow identification information.

In operation 815, the controller 202 may authenticate a user based on the information received from the node 201. For example, the controller 202 may inspect whether the user is an accessible user based on the user ID, the password, and/or the reinforced authentication information included in the received information and a database (e.g., an access policy database 311 or a blacklist database 314 of FIG. 3) included in a memory of the controller 202 and whether the user is included in a blacklist to identify whether corresponding user is blocked.

When there is the accessible user, in operation 820, a control flow table may be searched for control flow using the transmitted control flow identification information (the control flow ID) and user identification information (a user ID) may be added to identification information of the found control flow. For example, when the user is authenticated, the controller 202 may add the identification information of the user (e.g., the user ID) to the control flow identification information. The added user identification information may be used for controller access or network access of the authenticated user. The controller 202 may return an authentication complete state and access policy information of the authenticated user as the result of the user authentication.

In operation 825, the controller 202 may identify whether there is information of a destination network with which the currently accessed terminal is able to basically connect, in an access and tunnel policy matched with the identified information (e.g., the terminal, source network information, the user ID, or the like).

In operation 830, when it is accessible, for the corresponding node 201 to access a destination network (a destination node 204), tunneling types and gateways with which the node 201 is able to be connected may be listed by means of information, such as a type of a terminal included in control flow, position information of the terminal, an environment of the terminal, and a network including the terminal, an IP address of the terminal, which is identified by means of the controller 202, an IP address of the terminal, which is identified by the terminal, and the like and states of the listed gateways (throughput and whether there is a fault)

may be identified to identify one tunnel and one gateway optimized for the corresponding terminal among the listed gateways.

According to an embodiment, to provide and identify the optimized gateway, an order of gateways closest to an area where the terminal is located may be sorted, an order for providing tunneling optimized for the terminal may be sorted in an order of a gateway capable of generating an IPSec tunnel which is accessible most stably by the tunnel policy when the terminal is Windows and a gateway capable of generating an SSL/TLS tunnel optimized for Android when the terminal is Android, and an order may be sorted according the remaining amount of capacity (e.g., a tunnel access number or processor usage, a network bandwidth, or the like) capable of being processed by the corresponding gateway.

When the corresponding node 201 is connected with WIFI and there is a dedicated gateway for processing WIFI network traffic, when there is a dedicated gateway connected with an operator over a mobile network (3G, LTE, 5G, or the like), when the node 201 is wiredly connected, the corresponding network is a dedicated network configured in the form of an intranet for the corresponding terminal, and there is a dedicated gateway for controlling a data packet at the boundary of the dedicated network, or the like, an order may be sorted according to the gateway to which the node 201 is first accessible.

The other criteria of sorting may be added and changed with regard to cost for each interval or the like for processing data traffic on a distributed network, a billing system, a variable, or the like.

According to an embodiment, the controller 202 may calculate the corresponding sorting criterion in a complex manner and may sort gateways 203 capable of being provided to the corresponding terminal in order, thus processing the gateways 203 to be selected for each rank.

According to an embodiment, when there are the tunnel 210 and the gateway 203 accessible to the terminal 209, the controller 202 may transmit authentication and a series of pieces of information in which the corresponding node 201 is able to generate the tunnel 210 at the gateway 203 to the node 201, may register the corresponding tunnel generation information in a tunnel table 316, and may transmit the corresponding tunnel generation information to the gateway 203.

Furthermore, when access to the corresponding gateway 203 fails and when there is a gateway in a second rank among the listed gateways, information about whether it is accessible to the gateway in the second rank may be returned when the access fails. When the terminal is inaccessible to the corresponding gateway, authentication information for requesting to access the gateway in the second rank may be requested from the controller.

When there are the tunnel and the gateway accessible to the terminal, but it is impossible to access the tunnel because there is a large amount of throughput or there is a fault, information for reattempt for tunnel access may be returned to the terminal.

According to another embodiment, the controller 202 may determine that the user authentication is impossible. For example, when the identification information of the user is included in a blacklist database, the controller 202 may determine that the user authentication is impossible. In this case, in operation 820, the controller 202 may transmit information indicating that the user authentication is impossible to the node 201. In operation 825, the source node 201 may display a user interface screen indicating that the user authentication fails on its display.

Operations 635 to 650 in FIG. 6 may be applied to operations 835 to 850 in FIG. 8 in the same manner.

Figure 9:
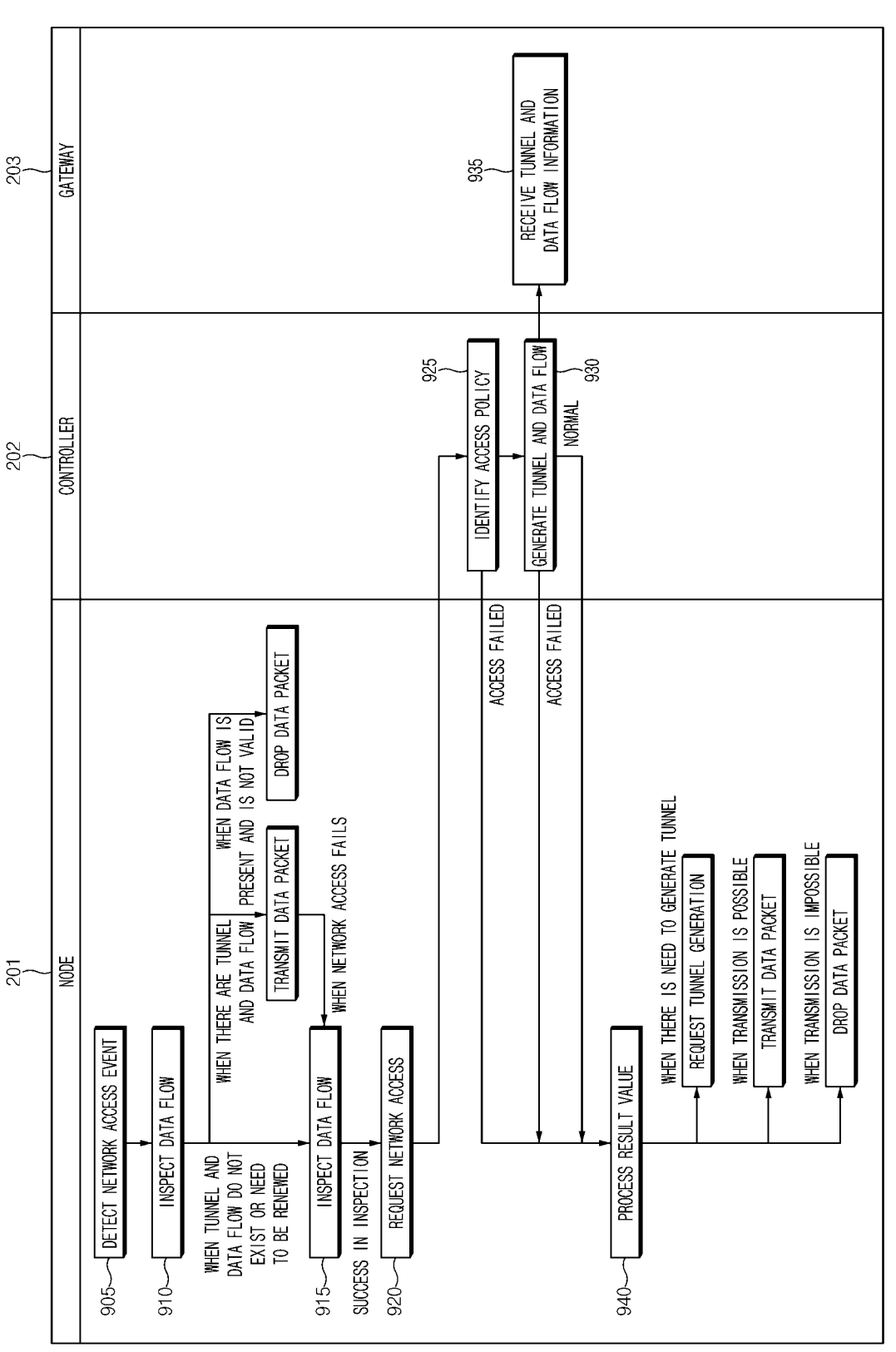
FIG. 9 illustrates a signal sequence diagram for processing network access.

FIG. 9 illustrates a signal sequence diagram for processing network access.

After a node 201 is authorized from a controller 202, the source node 201 may control network access of other applications stored in the source node 201 by means of an access control application 211 of the node 201, thus ensuring trusted data transmission.

Referring to FIG. 9, in operation 905, the access control application 211 may detect a network access event. For example, the access control application 211 may detect that a target application such as a web browser attempts to access a destination network including a destination node 204, such as the Internet. For example, a user may run the web browser and may input and call a web address to be accessed.

In operation 910, when the access control application 211 should perform communication with a service server, it may identify whether there is data flow information based on application identification information, a destination IP, and port information to communicate with the corresponding service server. When there is a tunnel and data flow, a data packet may be transmitted. When the data flow is present, but is not valid (e.g., it is impossible to transmit a data packet), the data packet may be dropped.

In operation 915, when there is no data packet or there is a need to update the data packet as an authentication time point expires and when the data flow should be updated by other matters (e.g., when network access fails), the access control application 211 may perform a validation procedure depending on a validation policy. The validation may include inspection about whether there are integrity and safety of the access application (e.g., whether an application is forged or falsified, code signing inspection, fingerprint inspection, or the like).

In operation 920, the access control application 211 may request network access from the controller 202. The access control application 211 may perform a network access request from the controller 202 based on control flow identification information (a control flow ID) for identifying control flow generated with the controller 202 before the network access event, application identification information, and a destination IP and port information of a server to be accessed.

In operation 925, the controller 202 may identify whether identification information requested for access (an application, a destination IP, service port information, and the like) is included and whether it is accessible to a gateway which is present between a destination server mapped to the corresponding identification information and a network boundary, in an access policy matched with the identified information (a terminal, a user, source network information, or the like) on the control flow. When it is inaccessible, the controller 202 may transmit the inaccessible result to the node 201.

In operation 930, when it is accessible, for the corresponding node 201 to access a destination network (a destination node 204), the controller 202 may list tunneling types and gateways 203 with which the node 201 is able to be connected by means of information, such as a type of a terminal included in control flow, position information of the terminal, an environment of the terminal, and a network including the terminal, an IP address of the node 201, which is identified by means of the controller, an IP address of the terminal, which is identified by the terminal, and the like and may identify states of the listed gateways 203 (throughput and whether there is a fault) to identify one tunnel and one gateway optimized for the corresponding node 201 among the listed gateways 203.

To provide and identify the optimized gateway, the controller 202 may sort an order of gateways closest to an area where the node 201 is located, may sort an order for providing tunneling optimized for the terminal in an order of a gateway capable of generating an IPSec tunnel which is accessible most stably by the tunnel policy when the node 201 is Windows and a gateway capable of generating an SSL/TLS tunnel optimized for Android when the terminal is Android, and may sort an order according the remaining amount of capacity (e.g., a tunnel access number or processor usage, a network bandwidth, or the like) capable of being processed by the corresponding gateway.

When the corresponding node 201 is connected with WIFI and there is a dedicated gateway for processing WIFI network traffic, when there is a dedicated gateway connected with an operator over a mobile network (3G, LTE, 5G, or the like), when the node 201 is wiredly connected, the corresponding network is a dedicated network configured in the form of an intranet for the corresponding node 201, and there is a dedicated gateway for controlling a data packet at the boundary of the dedicated network, or the like, the controller 202 may sort an order depending on the gateway to which the node 201 is first accessible.

The other criteria of sorting may be added and changed with regard to cost for each interval or the like for processing data traffic on a distributed network, a billing system, a variable, or the like.

According to an embodiment, the controller 202 may calculate the corresponding sorting criterion in a complex manner and may sort gateways 203 capable of being provided to the corresponding node 201 in order, thus processing the gateways 203 to be selected for each rank.

When there are the tunnel 210 and the gateway 203 accessible to the node 201, the controller 202 may transmit authentication and a series of pieces of information in which the corresponding node 201 is able to generate the tunnel 210 at the gateway 203 to the node 201, may register the corresponding tunnel generation information in a tunnel table 316, and may transmit the corresponding tunnel generation information to the gateway 203 in operation 935.

Furthermore, when access to the corresponding gateway 203 fails and when there is a gateway in a second rank among the listed gateways, information about whether it is accessible to the gateway in the second rank may be returned when the access fails. When the node 201 is inaccessible to the corresponding gateway 203, authentication information for requesting to access the gateway in the second rank may be requested from the controller 202.

When there are the tunnel 210 and the gateway 203 accessible to the node 201, but it is impossible to access the tunnel because there is a large amount of throughput or there is a fault, information for reattempt for tunnel access may be returned to the node 201.

When it is inaccessible, the controller 202 may transmit the inaccessible result to the node 201.

When tunneling is generated and there is no valid data flow information in a data flow table, data flow information may be generated based on a source IP address, a destination IP address, and port information to grant access of the corresponding application and the corresponding information may be transmitted to each of the identified gateways 203.

When there is accessible data flow information in a data flow table 317, the corresponding information may be transmitted to the node 201.

In operation 940, the access control application 211 may process an access request result value received from the controller 202. When there is a need to generate a tunnel, the tunnel generation may be requested. Details about the tunnel generation request will be described in FIG. 10 described below.

When it is accessible based on data flow which is previously present, a data packet may be transmitted. Meanwhile, when it fails in network access, the data packet may be dropped.

As described above, the node 201 according embodiments may include a communication circuit, a processor operatively connected with the communication circuit, and a memory operatively connected with the processor and storing an access control application 211. The memory may store instructions, when executed by the processor, causing the node 201 to detect a network access event for a destination network, by means of the access control application 211, identify whether there are data flow and a tunnel corresponding to the destination network and authorized from an external server, by means of the access control application 211, and transmit a data packet through the tunnel, when there are the authorized data flow and the authorized tunnel. The tunnel may be generated between the node and a gateway based on tunneling information received from the external server. The tunneling information about one or more tunnels and gateways in which the node is able to perform tunneling among one or more tunnels and gateways listed by the external server based on a node environment of the node and a network environment.

In an embodiment, the node environment may include at least one of an operating system of the node 201, a type of the node 201, a position of the node 201, or a distance between the node 201 and gateways. The network environment may indicate a wired, wireless, or mobile network or the like.

Figure 10:
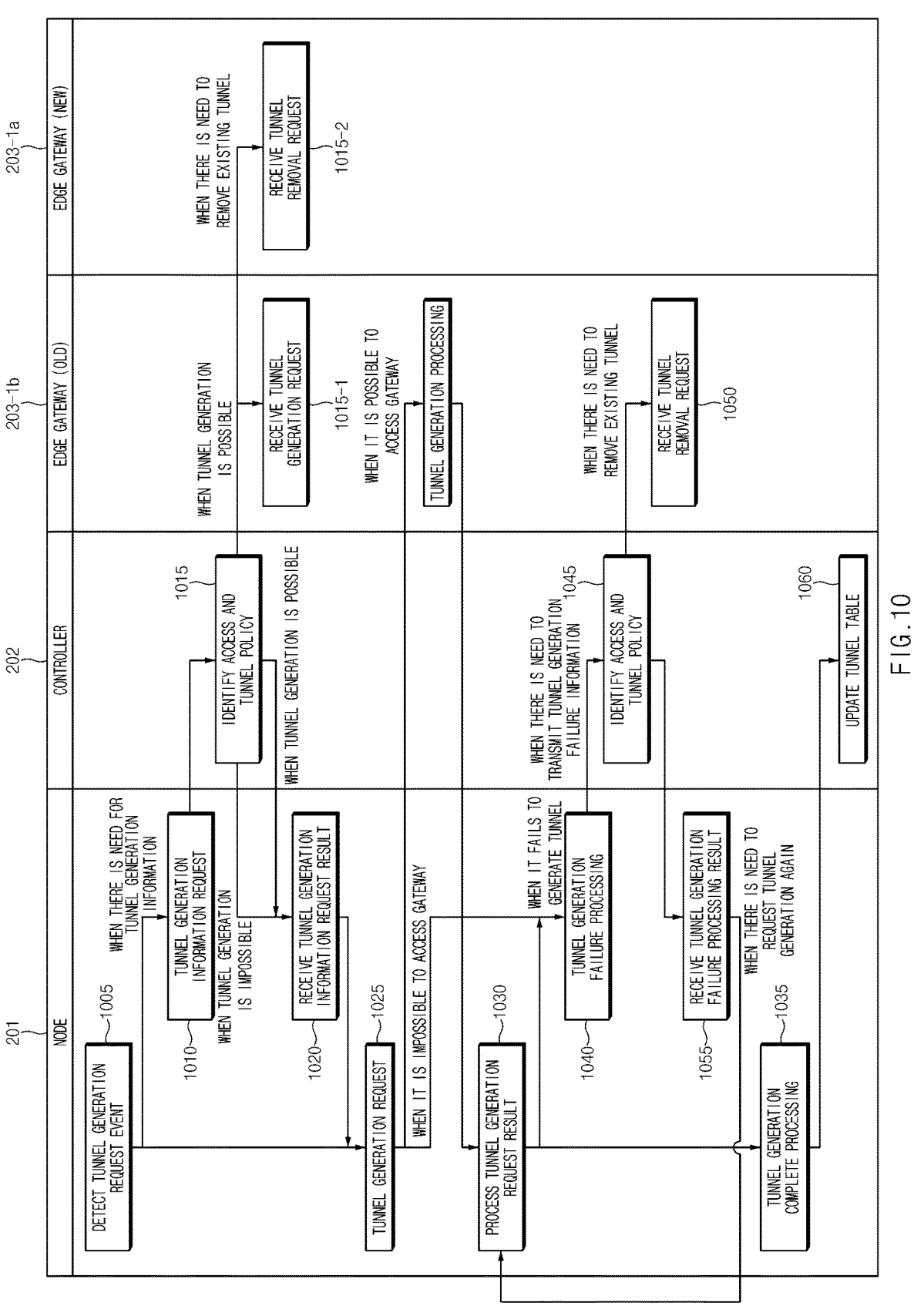
FIG. 10 illustrates a signal sequence diagram for processing a tunnel generation request.

FIG. 10 describes a tunnel generation request operation according to various embodiments. FIG. 10 illustrates a signal sequence diagram for processing a tunnel generation request.

Tunnel Generation Request Event

In operation 1005, when there is a need to generate a tunnel, a node 201 may detect a tunnel generation request event. When the tunnel is generated, when detailed information (e.g., information such as tunneling, a gateway, or authentication) necessary to generate the tunnel is not received from a controller 202 and when there is only information for identifying whether there is a need to simply generate the tunnel and a tunnel necessary to access a destination network, a tunnel generation information request process may be performed for the controller 202 (operation 1010).

When there is the detailed information necessary to generate the tunnel, a tunnel generation request procedure may be performed (operation 1025).

Tunnel Generation Information Request

In operation 1010, the node 201 may request a gateway for generating the tunnel and a series of pieces of information, including tunneling authentication or the like, necessary to generate the tunnel from the controller 202.

Access and Tunnel Policy Identification

In operation 1015, when receiving the tunnel generation information request from the node 201 and when the tunnel generation is possible, the controller 202 may transmit information for identifying a tunnel necessary for the corresponding node 201 to access the destination network. Meanwhile, when the tunnel generation is impossible, the controller 202 may transmit a message to the effect that the tunnel generation is impossible to the node 201.

When it is accessible, for the corresponding node 201 to access the destination network, tunneling types and gateways with which the terminal is able to be connected may be listed by means of information, such as a type of a terminal included in control flow, position information of the terminal, an environment of the terminal, and a network including the terminal, an IP address of the terminal, which is identified by means of the controller 202, an IP address of the terminal, which is identified by the terminal, and the like and states of the listed gateways (throughput and whether there is a fault) may be identified to identify one tunnel and one gateway optimized for the corresponding terminal among the listed gateways.

To provide and identify the optimized gateway, an order of gateways closest to an area where the node 201 is located may be sorted, an order for providing tunneling optimized for the terminal may be sorted in an order of a gateway capable of generating an IPSec tunnel which is accessible most stably by the tunnel policy when the node 201 is Windows and a gateway capable of generating an SSL/TLS tunnel optimized for Android when the node 201 is Android, the corresponding gateway 203 may be excluded from the list when it is during a fault, and an order may be sorted according the remaining amount of capacity (e.g., a tunnel access number or processor usage, a network bandwidth, or the like) capable of being processed by the corresponding gateway 203.

When the corresponding node 201 is connected with WIFI and there is a dedicated gateway for processing WIFI network traffic, when there is a dedicated gateway connected with an operator over a mobile network (3G, LTE, 5G, or the like), when the node 201 is wiredly connected, the corresponding network is a dedicated network configured in the form of an intranet for the corresponding terminal, and there is a dedicated gateway for controlling a data packet at the boundary of the dedicated network, or the like, an order may be sorted according to the gateway to which the node 201 is first accessible.

The other criteria of sorting may be added and changed with regard to cost for each interval or the like for processing data traffic on a distributed network, a billing system, a variable, or the like.

The controller 202 may calculate the corresponding sorting criterion in a complex manner and may sort gateways 203 capable of being provided to the corresponding node 201 in order, thus processing the gateways 203 to be selected for each rank.

When there are a tunnel and a gateway accessible to the terminal, the controller 202 may transmit authentication and a series of pieces of information in which the corresponding node 201 is able to generate the tunnel 210 at the gateway 203 to the node 201, may register the corresponding tunnel generation information in a tunnel table 316, and may transmit the corresponding tunnel generation information to the gateway 203-1b.

Furthermore, when access to the corresponding gateway 203 fails and when there is a gateway in a second rank among the listed gateways, information about whether it is accessible to the gateway in the second rank may be returned when the access fails. When the terminal is inaccessible to the corresponding gateway, authentication information for requesting to access the gateway in the second rank may be requested from the controller.

When there are the tunnel and the gateway accessible to the node 201, but it is impossible to access the tunnel because there is a large amount of throughput or there is a fault, information for reattempt for tunnel access may be returned to the node 201.

When tunnel generation information previously provided to the corresponding terminal is not valid, according to a new tunnel generation information request, (e.g., when it is impossible to access the gateway using the previously provided tunnel generation information depending the environment of the terminal and the network situation), the removal of existing tunnel information may be requested not to generate the tunnel using the corresponding tunnel generation information at the corresponding gateway 203-1a based on tunnel information identified in a tunnel table 316 (operation 1015-2).

Reception of Tunnel Generation Information Request Result

In operation 1020, the node 201 may receive a tunnel generation information request result from the controller 202. When it is accessible to the gateway as there is the tunnel generation information, a tunnel generation request procedure may be performed. When it is inaccessible to the gateway as there is no tunnel generation information, a tunnel generation failure processing may be performed.

Tunnel Generation Request and Result Processing

In operation 1030, the node 201 may request the corresponding gateway to generate a tunnel based on a gateway for generating the tunnel and a series of pieces of information necessary to generate the tunnel, such as tunneling authentication, which are received from the controller.

When the tunnel generation fails due to the situation of the network (when it is impossible to access the gateway) and the situation of the terminal (when the corresponding tunneling technology is not supported and the protocol is incompatible), and the other tunneling failure with the gateway, a tunnel failure processing procedure (operation 1040) may be performed.

When the tunnel generation is normally completed with the corresponding gateway, a tunnel generation complete processing procedure (operation 1035) may be performed.

Tunnel Generation Complete Processing

In operation 1035, when completing the generation of the tunnel 210 with the gateway 203, the node 201 may deliver tunnel generation complete information to the controller 202, and the controller 202 may update a tunnel table 316 based on the received tunnel generation complete information (an IP assigned to the terminal, tunnel identification information, or the like) (operation 1060), thus managing the tunnel connected with the corresponding terminal and collecting the tunnel when the connection of the corresponding terminal or gateway is ended.

Tunnel Generation Failure Processing

In operation 1040, when the node 201 fails to generate the tunnel 210 with the gateway 203 and when the node 201 requests a series of pieces of information necessary to generate the tunnel from the controller 202 and does not receive the tunnel generation related information or there is no tunnel information capable of being generated, it may perform tunnel generation failure related processing.

When the node 201 fails to generate the tunnel with the gateway 203, it may transmit a series of pieces of information associated with generating the tunnel (a series of pieces of information for identifying the tunnel which will be generated by the controller between the corresponding terminal and the gateway, such as tunnel identification information or gateway identification information) to the controller 202.

Access and Tunnel Policy Identification

In operation 1045, information of the tunnel and the gateway being generated, which is previously registered in the tunnel table, may be identified based on the tunnel generation failure information transmitted by the corresponding terminal and the removal of existing tunnel information may be requested not to generate the tunnel using the corresponding tunnel generation information at the corresponding gateway based on the identified tunnel information.

Furthermore, for the corresponding terminal to access the destination network, tunneling types and gateways with which the terminal is able to be connected may be listed by means of information, such as a type of a terminal included in control flow, position information of the terminal, an environment of the terminal, and a network including the terminal, an IP of the terminal, which is identified by means of the controller, an IP of the terminal, which is identified by the terminal, and the like and states of the listed gateways (throughput and whether there is a fault) may be identified to identify one tunnel and one gateway optimized for the corresponding terminal among the listed gateways.

A history in which the terminal previously requests access when the optimized tunnel and gateway is identified. When there is a history in which the corresponding terminal fails to generate it using the corresponding tunnel generation information, it may be regarded as a state in the terminal is unable to access the corresponding tunnel generation information (a state in which it is impossible to access the corresponding gateway depending on the environment of the terminal and the network situation) to identify information of a tunnel and a gateway in a second rank.

To provide and identify the optimized gateway, an order of gateways closest to an area where the node 201 is located may be sorted, an order for providing tunneling optimized for the terminal may be sorted in an order of a gateway capable of generating an IPSec tunnel which is accessible most stably by the tunnel policy when the terminal is Windows and a gateway capable of generating an SSL/TLS tunnel optimized for Android when the terminal is Android, the corresponding gateway may be excluded from the list when it is during a fault, and an order may be sorted according to the remaining amount of capacity (e.g., a tunnel access number or processor usage, a network bandwidth, or the like) capable of being processed by the corresponding gateway.

When the corresponding node 201 is connected with WIFI and there is a dedicated gateway for processing WIFI network traffic, when there is a dedicated gateway connected with an operator over a mobile network (3G, LTE, 5G, or the like), when the node 201 is wiredly connected, the corresponding network is a dedicated network configured in the form of an intranet for the corresponding terminal, and there is a dedicated gateway for controlling a data packet at the boundary of the dedicated network, or the like, an order may be sorted according to the gateway to which the node 201 is first accessible.

The other criteria of sorting may be added and changed with regard to cost for each interval or the like for processing data traffic on a distributed network, a billing system, a variable, or the like.

The controller 202 may calculate the corresponding sorting criterion in a complex manner and may sort gateways capable of being provided to the corresponding node 201 in order, thus processing the gateways to be selected for each rank.

When there are the tunnel 210 and the gateway 203 accessible to the terminal 201, the controller 202 may transmit authentication and a series of pieces of information in which the corresponding node 201 is able to generate the tunnel 210 at the gateway 203 and may transmit a series of pieces of information for generating the tunnel at the corresponding gateway 210 to the node 201.

When the corresponding tunnel generation information replaces the tunnel previously requested to be generated, data flow information dependent on an existing tunnel may change to the updated tunnel and the changed data flow information may be transmitted to the gateway (an edge gateway 203-1a of FIG. 10).

Furthermore, the removal of the previously generated tunnel information may be requested from the gateway (the edge gateway 203-1a of FIG. 10) (operation 1050).

Furthermore, when access to the corresponding gateway 203 fails and when there is a gateway in a second rank among the listed gateways, information about whether it is accessible to the gateway in the second rank may be returned when the access fails. When the terminal is inaccessible to the corresponding gateway, authentication information for requesting to access the gateway in the second rank may be requested from the controller.

When there are the tunnel and the gateway accessible to the node 201, but it is impossible to access the tunnel because there is a large amount of throughput or there is a fault, information for reattempt for tunnel access may be returned to the terminal (operation 1055).

Reception of Tunnel Generation Failure Processing Result

In operation 1055, the node 201 may receive a tunnel generation failure processing result from the controller 202.

When there is new tunnel generation information, a tunnel generation request procedure may be performed (operation 1025).

Figure 11:
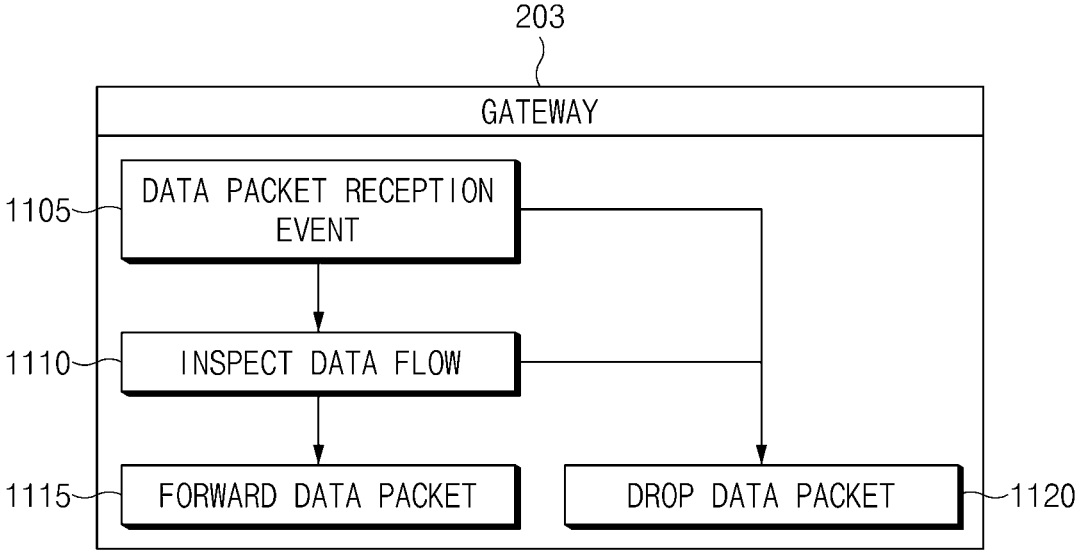
FIG. 11 illustrates a flowchart for forwarding a data packet according to various embodiments.

FIG. 11 illustrates a flowchart for forwarding a data packet according to various embodiments.

According to an embodiment, when receiving a data packet through an authorized tunnel (operation 1105), the gateway 203 may identify there is data flow capable of being forwarded in a data flow table based on a source IP, a destination IP, and destination port information included in 5-tuples information of an Internet protocol (IP) (operation 1110). When there is the data flow, the corresponding data packet may be forwarded (operation 1115). When there is no data flow, the corresponding data packet may be dropped (operation 1120).

Figure 12:
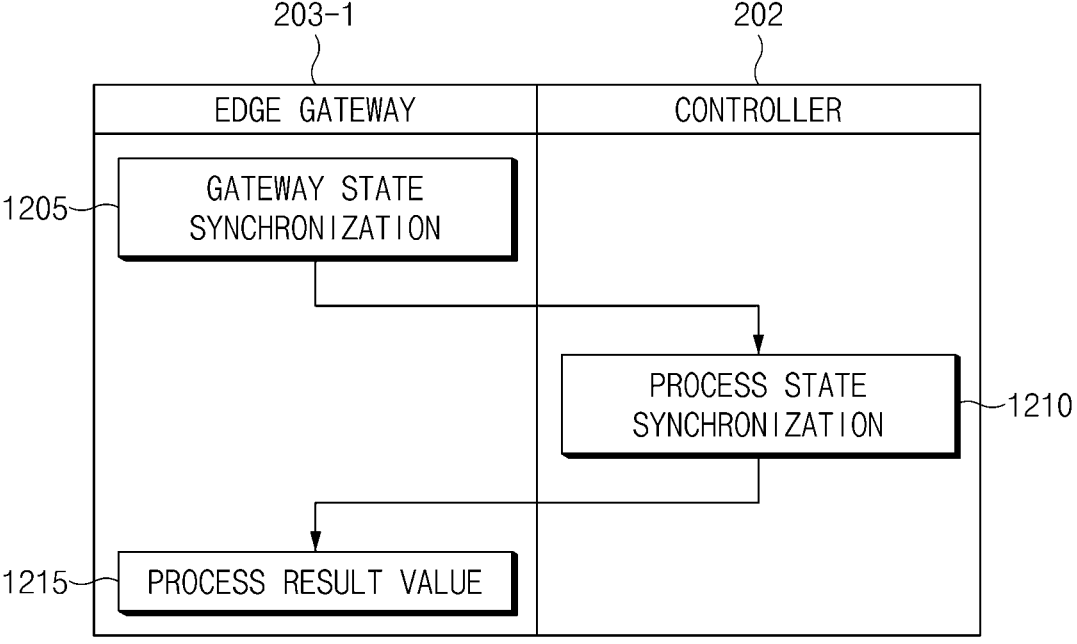
FIG. 12 illustrates a flowchart for synchronizing a gateway state according to various embodiments.

FIG. 12 illustrates a flowchart for synchronizing a gateway state according to various embodiments.

A gateway 203 may transmit the number of tunnels currently connected at all times and occupancy rate information of a process, a memory, a bandwidth, or the like to a controller 202, and the controller 202 may process the tunnel 201 optimized in the distributed gateways to be connected with the gateway 203, based on the corresponding value (operations 1205, 1201, and 1215).

Furthermore, when not receiving synchronization information on a periodic basis from the gateway 203, the controller 202 may determine that the corresponding gateway 203 is in a fault state to guide a tunnel of a previously connected terminal to another gateway or prevent a tunnel from being generated at the corresponding gateway 203 when requesting to generate a new tunnel.

In addition, when switching from a fault generation state to a normal state, the controller 202 may process the tunnel to be connected with the gateway 203, the fault recovery of which is completed, when requesting to generate the new tunnel.

Figure 13:
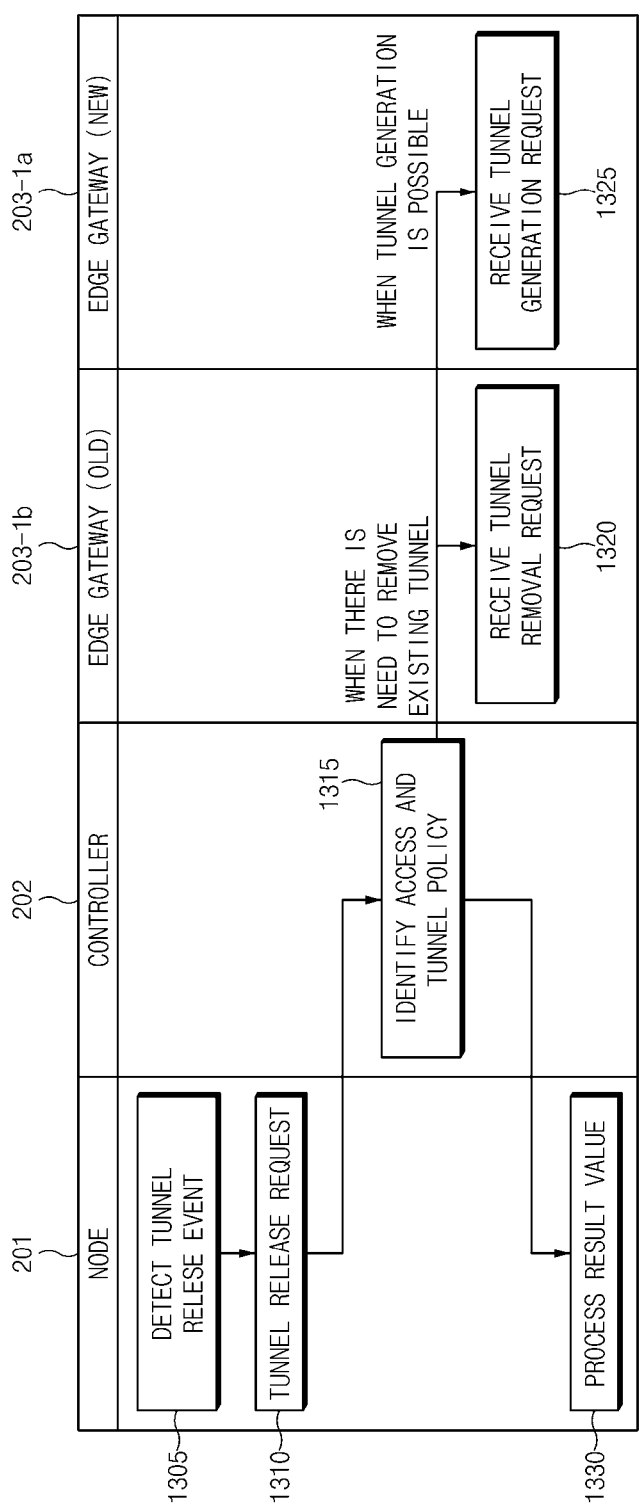
FIG. 13 illustrates a flowchart for releasing a tunnel according to various embodiments.

FIG. 13 illustrates a flowchart for releasing a tunnel according to various embodiments.

In operation 1305, an access control application 211 may always monitor whether tunnel access is released and may detect a tunnel release event.

In operation 1310, when the tunnel access is released, a tunnel release request may be performed for a controller 202 and information for identifying the released tunnel upon the request, for example, information including an IP or tunnel identification information assigned to a terminal may be transmitted.

In operation 1315, the controller 202 may identify the received tunnel release information to identify the corresponding tunnel identification information from a tunnel table 316 and may transmit a tunnel removal request to an existing gateway 203-1b (an edge gateway 203-1b in FIG. 13), when it is present in the tunnel table 316 and when there is a need to remove the tunnel.

In operation 1315, when the corresponding tunnel access release request is ended according to a network situation of a terminal or a gateway, when there is an existing tunnel access release request to provide the terminal with a tunnel optimized according to a change in access position, or the like, the controller 202 may identify an access and tunnel policy for generating a new tunnel to always maintain access between the node 201 and a destination node 204.

When there is a need to maintain access by identifying a policy and when an alternatively tunnel should be generated, for the corresponding node 201 to access the destination network 204, tunneling types and gateways with which the node 201 is able be connected may be listed by means of information, such as a type of a terminal included in control flow, position information of the terminal, an environment of the terminal, and a network including the terminal, an IP address of the terminal, which is identified by means of the controller 202, an IP address of the terminal, which is identified by the terminal, and the like and states of the listed gateways (throughput and whether there is a fault) may be identified to identify one tunnel and one gateway optimized for the corresponding terminal among the listed gateways.

To provide and identify the optimized gateway, an order of gateways closest to an area where the terminal is located may be sorted, an order for providing tunneling optimized for the terminal may be sorted in an order of a gateway capable of generating an IPSec tunnel which is accessible most stably by the tunnel policy when the terminal is Windows and a gateway capable of generating an SSL/TLS tunnel optimized for Android when the terminal is Android, the corresponding gateway may be excluded from the list when it is during a fault, and an order may be sorted according the remaining amount of capacity (e.g., a tunnel access number or processor usage, a network bandwidth, or the like) capable of being processed by the corresponding gateway.

When the corresponding terminal is connected with WIFI and there is a dedicated gateway for processing WIFI network traffic, when there is a dedicated gateway connected with an operator over a mobile network (3G, LTE, 5G, or the like), and when the node 201 is wiredly connected, the corresponding network is a dedicated network configured in the form of an intranet for the corresponding terminal, and there is a dedicated gateway for controlling a data packet at the boundary of the dedicated network, an order may be sorted according to the gateway to which the node 201 is first accessible. The other criteria of sorting may be added and changed with regard to cost for each interval or the like for processing data traffic on a distributed network, a billing system, a variable, or the like.

The controller 202 may calculate the corresponding sorting criterion in a complex manner and may sort gateways capable of being provided to the corresponding terminal in order, thus processing the gateways to be selected for each rank.

When there are a tunnel and a gateway accessible to the terminal, in operation 1325, the controller 202 may transmit authentication and a series of pieces of information in which the corresponding node 201 is able to generate the tunnel at the gateway 203 to the node 201, may register the corresponding tunnel generation information in a tunnel table, and may transmit the corresponding tunnel generation information to the gateway 203.

When the corresponding generated information replaces the previously generated tunnel, data flow information dependent on an existing tunnel may change to the updated tunnel and the changed data flow information may be transmitted to the gateway.

In operation 1320, the removal of the previously generated tunnel information may be requested from an existing gateway 203-1b.

Furthermore, when access to the corresponding gateway fails and when there is a gateway in a second rank among the listed gateways, information about whether it is accessible to the gateway in the second rank may be returned when the access fails. When the terminal is inaccessible to the corresponding gateway, authentication information for requesting to access the gateway in the second rank may be requested from the controller.

When there are the tunnel and the gateway accessible to the terminal, but it is impossible to access the tunnel because there is a large amount of throughput or there is a fault, information for reattempt for tunnel access may be returned to the terminal.

When it is inaccessible, the controller may transmit the inaccessible result to the terminal (operation 1330).

Figure 14:
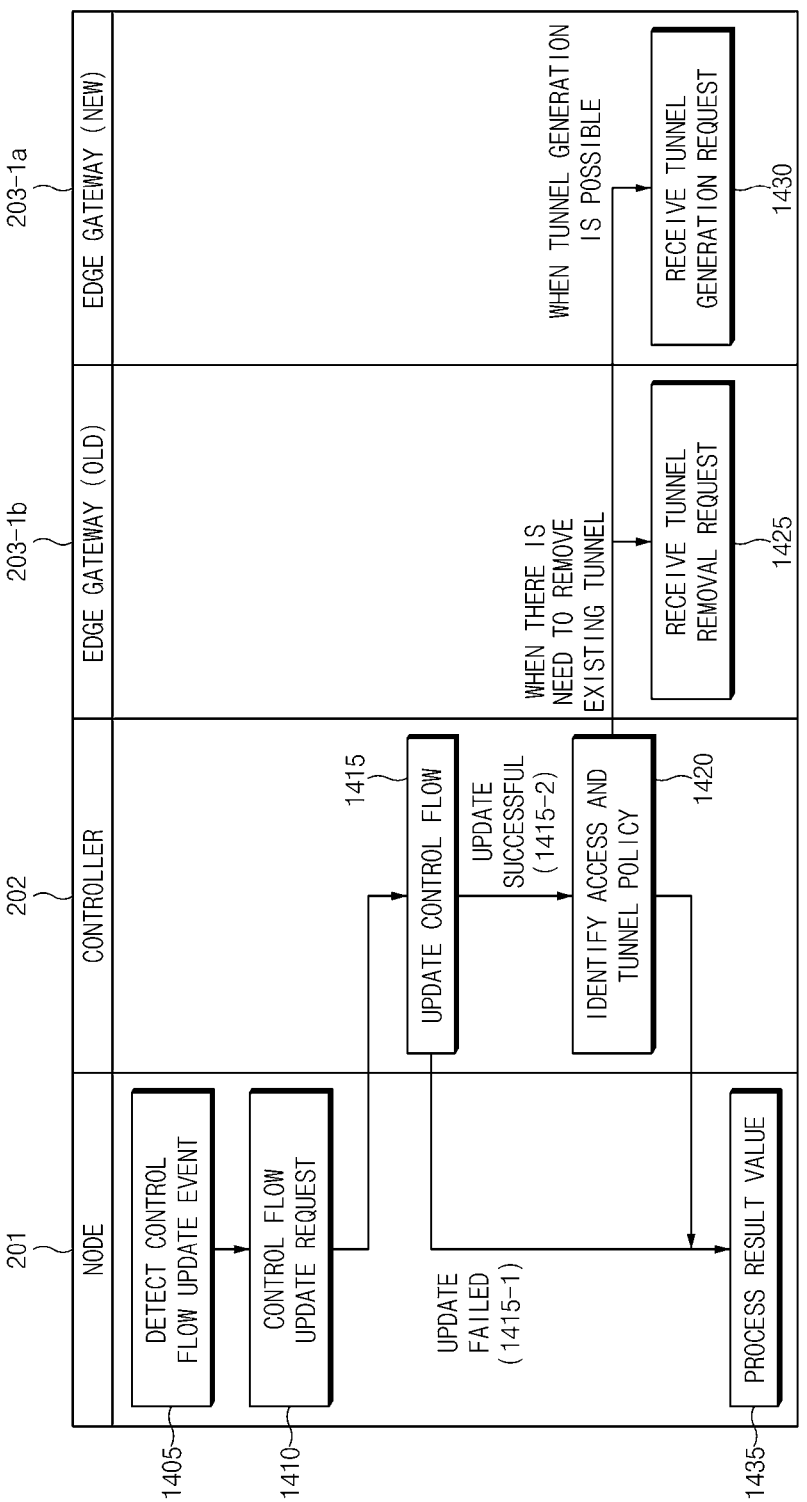
FIG. 14 illustrates a signal sequence diagram for updating control flow according to various embodiments.

FIG. 14 illustrates a signal sequence diagram for updating control flow according to various embodiments.

A node 201 may update an expiration time point of control flow for each specified period, thus receiving updated control flow from a controller 202. Furthermore, the node 201 may transmit data packet information to the controller 202 at intervals of a certain period and may identify that the node 201 normally operates. For example, an access control application 211 may maintain control flow information, may transmit a current network access state of the terminal (a change in connected network information, for example, when it is handed over from WIFI to a mobile network or it changes from a wireless network to a wired network) and environment information (position information of the terminal or the like) to the controller, and may request to update control flow based on a control flow ID periodically assigned to receive an optimized tunnel from the controller.

Referring to FIG. 14, in operation 1405, the access control application 211 of the node 201 may detect a control flow update event. For example, the access control application 211 may detect the control flow update event at a specified period.

In operation 1410, the access control application 211 may request to update control flow from the controller 202. For example, the access control application 211 may transmit control flow identification information to the controller 202.

In operation 1415, the controller 202 may identify whether there is control flow in a control flow table 315 based on the control flow identification information requested by the terminal.

When there is no control flow (e.g., for access release by another security system, access release due to excess of an update time point, internal risk detection, or the like, or the like), because the access of the corresponding node 201 is not valid, inaccessible information may be returned (operation 1415-1).

When there is control flow, an update time point may be updated and access and tunnel policy identification may be requested (operation 1415-2).

In operation 1420, the controller may identify whether to generate an alternative tunnel based on a network access state and environment information transmitted by the terminal, IP information of the terminal identified upon an update, or the like.

For the corresponding terminal to access a destination network to identify whether to generate the alternative tunnel, tunneling types and gateways with which the terminal is able to be connected may be listed by means of information, such as a type of a terminal included in control flow, position information of the terminal, an environment of the terminal, and a network including the terminal, an IP of the terminal, which is identified by means of the controller, an IP of the terminal, which is identified by the terminal, and the like and states of the listed gateways (throughput and whether there is a fault) may be identified to identify one tunnel and one gateway optimized for the corresponding terminal among the listed gateways.

To provide and identify the optimized gateway, an order of gateways closest to an area where the terminal is located may be sorted, an order for providing tunneling optimized for the terminal may be sorted in an order of a gateway capable of generating an IPSec tunnel which is accessible most stably by the tunnel policy when the terminal is Windows and a gateway capable of generating an SSL/TLS tunnel optimized for Android when the terminal is Android, the corresponding gateway may be excluded from the list when it is during a fault, and an order may be sorted according the remaining amount of capacity (e.g., a tunnel access number or processor usage, a network bandwidth, or the like) capable of being processed by the corresponding gateway.

The other criteria of sorting may be added and changed with regard to cost for each interval or the like for processing data traffic on a distributed network, a billing system, a variable, or the like.

The controller 202 may calculate the corresponding sorting criterion in a complex manner and may sort gateways capable of being provided to the corresponding terminal in order, thus processing the gateways to be selected for each rank.

When there are a tunnel and a gateway which are alternative at the terminal through the above process, the controller may transmit authentication and a series of pieces of information in which the corresponding terminal is able to generate the tunnel at the gateway to the terminal, may register the corresponding tunnel generation information in a tunnel table 316, and may transmit the corresponding tunnel generation information to the gateway.

When the corresponding tunnel generation information replaces the previously generated tunnel, data flow information dependent on an existing tunnel may change to the updated tunnel and the changed data flow information may be transmitted to the gateway (operation 1430).

Furthermore, the removal of the previously generated tunnel information may be requested from an existing gateway (operation 1425).

Furthermore, when access to the corresponding gateway fails and when there is a gateway in a second rank among the listed gateways, information about whether it is accessible to the gateway in the second rank may be returned when the access fails. When the terminal is inaccessible to the corresponding gateway, authentication information for requesting to access the gateway in the second rank may be requested from the controller.

When the result of updating the control flow is inaccessible, the application may be ended or the access of the application to all networks may be blocked. When the result of updating the control flow is normal and when an existing tunnel should be removed, a tunnel release procedure may be performed (operation 1425). When a new tunnel should be connected, a tunnel generation request procedure may be performed (operation 1430).

Figure 15:
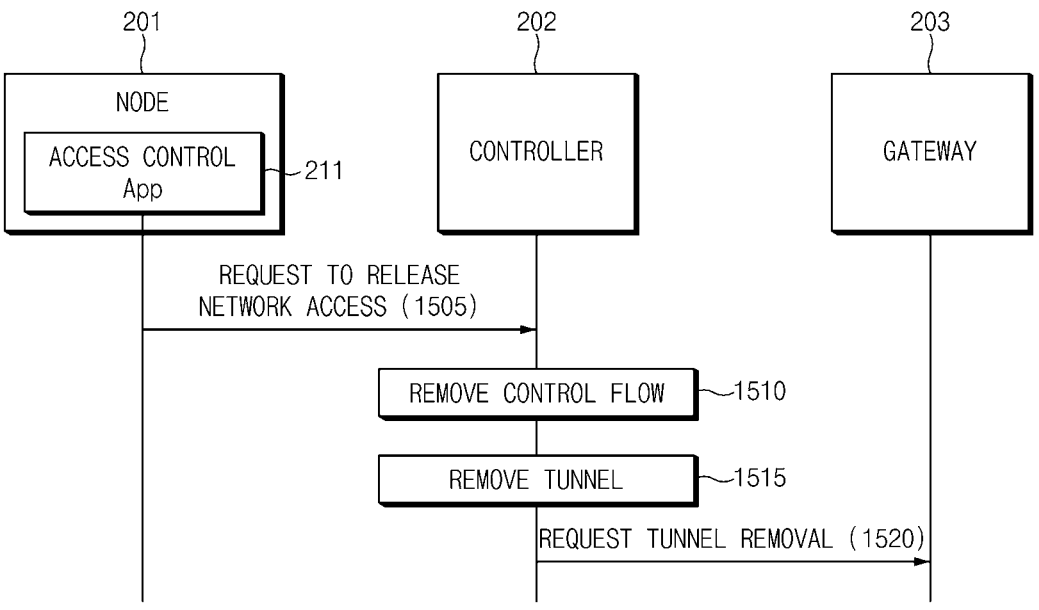
FIG. 15 illustrates a signal sequence diagram for releasing network access according to various embodiments.
Figure 16:
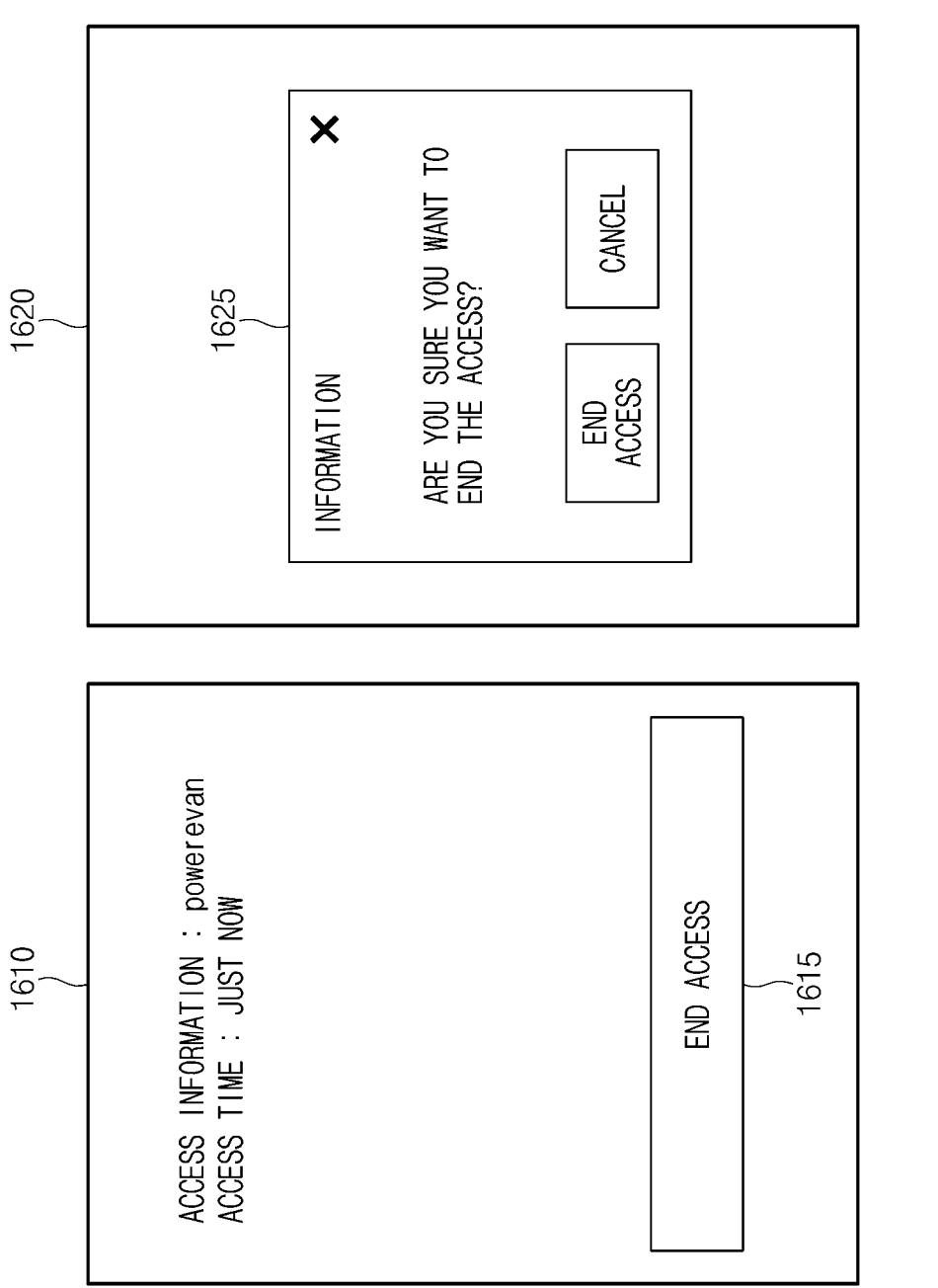
FIG. 16 illustrates a user interface screen for releasing network access according to various embodiments.

FIG. 15 illustrates a signal sequence diagram for releasing network access according to various embodiments. FIG. 16 illustrates a user interface screen for releasing network access according to various embodiments.

Referring to FIG. 15, in operation 1505, a node 201 may request a control 202 to release network access. For example, the node 201 may transmit identification information of control flow between the node 201 and the controller 202 together with information for requesting to release the network access to the controller 202.

According to an embodiment, the node 201 may attempt to release the network access in response to a network access release event such as a request of a user, restart of the node 201, or a request of an access control application 211. For example, referring to FIG. 16, the node 201 may receive a user input for selecting an access end button 1615 on a user interface screen 1610 output on its display. The node 201 may output a user interface screen 1620 including a pop-up window 1625 to identify access end again from the user. For another example, the node 201 may immediately perform operation 1505 without outputting the user interface screen 1620.

In operation 1510, the controller 202 may remove (or release) control flow corresponding to the received identification information, in response to the request of the node 201.

In operation 1515, the controller 202 may remove (or release or update) a tunnel dependent on the removed control flow. For example, the tunnel dependent on the removed control flow may be plural in number. In this case, the controller 202 may remove (or release) the control flow dependent on the removed control flow.

In operation 1520, the controller 202 may request the gateway 203 to remove the tunnel dependent on the removed control flow. At this time, a gateway 203 may remove the tunnel in response to the request of the controller 202.

Through the above-mentioned operation, a system including a destination node 204 may provide complete blocking and isolation in which it is not able to the data packet transmitted from the node 201 any longer.

The above description is merely an illustrative explanation of the technical idea disclosed in the present disclosure, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the technical idea disclosed in the present disclosure should be interpreted in accordance with the claims below, and all the technical ideas within the scope equivalent to the claims should be included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A node, comprising:
a communication circuit;
a processor operatively connected with the communication circuit; and
a memory operatively connected with the processor and configured to store an access control application,
wherein the memory stores instructions, when executed by the processor, causing the node to:
    detect a network access event for a destination network, by means of the access control application;
    identify whether there are data flow and a tunnel corresponding to the destination network and authorized from an external server, by means of the access control application;
    transmit a data packet through the tunnel, when there are the authorized data flow and the authorized tunnel,
    request the gateway to generate a tunnel, by means of the access control application;
    receive a tunnel generation information request result from the external server;
    generate the tunnel, when access between the node and the gateway is possible as there is tunnel generation information received from the external server in the gateway; and
    perform tunnel generation failure processing, when it fails to generate the tunnel due to a change in situation of the network and the node,
    wherein the tunnel is generated between the node and a gateway based on tunneling information received from the external server, and
    wherein the tunneling information includes information about one or more tunnels and gateways in which the node is able to perform tunneling among one or more tunnels and gateways listed by the external server based on a node environment of the node and a network environment and information for each rank of the gateway.

2. The node of claim 1, wherein the node environment includes information about a distance between the node and the gateways, and wherein the listing of the gateways is based on the information about the distance.

3. The node of claim 1, wherein the node environment further includes information about an operating system of the node, and wherein the listing of the gateways is based on the operating system of the node.

4. The node of claim 1, wherein the node first accesses a dedicated gateway, when there is the dedicated gateway for the node, and wherein that there is the dedicated gateway includes one of that there is a dedicated gateway for processing WIFI network traffic, that there is a dedicated gateway connected with an operator over a mobile network, or that the node is wired connected, the corresponding network is a dedicated network configured in the form of an intranet for the node, and there is a dedicated gateway for controlling a data packet at a boundary of the dedicated network.

5. The node of claim 1, wherein the node requests authentication information for requesting to access a gateway in a second rank to the external server, when the node fails in access to the identified gateway.

6. The node of claim 1, wherein the instructions, when executed by the processor, causing the node to, when it fails to generate the tunnel:

retransmit information about a changed node environment and a changed network environment to the external server;

receive gateway and tunneling information in which the node is able to perform tunneling at one tunnel and one gateway for each rank among one or more tunnels and gateways listed based on the changed node environment and the changed network environment, from the external server; and request the gateway to generate the tunnel based on the gateway and the tunneling information.

7. The node of claim 6, wherein the instructions cause the node to:

request a change from the external server, such that data flow information dependent on an existing tunnel changes to an updated tunnel and the changed data flow information is transmitted to a new gateway, when the tunneling information replaces the tunnel previously requested to be generated; and request a gateway at which the existing tunnel is generated to delete previously generated tunnel information.

8. The node of claim 1, wherein the instructions cause the node to:

detect a controller control event for the external server by means of the access control application;

request controller access from the external server using the communication circuit, in response to the detected controller access event;

receive a first response to the controller access request from the external server, the first response including identification information of generated control flow and the tunneling information; and update the authorized data flow based on the received tunneling information.

9. The node of claim 1, wherein the instructions cause the node to:

receive a first user input for requesting user authentication;

request user authentication for a user of the node from the external server, using the communication circuit, the user authentication request including information corresponding to the first user;

receive a second response to the user authentication request from the external server, the second response including the tunneling information; and update the authorized data flow based on the tunneling information.

\* \* \* \* \*